FIG. 5

INVENTORS
NELSON R. FRIEBERG
OSCAR F. LARSEN
BY
THEIR ATTORNEYS

INVENTORS
NELSON R. FRIEBERG
OSCAR F. LARSEN

THEIR ATTORNEYS

Oct. 26, 1954  N. R. FRIEBERG ET AL  2,692,726
CALCULATING MACHINE FUNCTION CONTROL MECHANISM
Filed April 16, 1953  14 Sheets-Sheet 7

INVENTORS
NELSON R. FRIEBERG
OSCAR F. LARSEN
BY
THEIR ATTORNEYS

Oct. 26, 1954    N. R. FRIEBERG ET AL    2,692,726
CALCULATING MACHINE FUNCTION CONTROL MECHANISM
Filed April 16, 1953    14 Sheets-Sheet 8

INVENTORS
NELSON R. FRIEBERG
OSCAR F. LARSEN

BY
THEIR ATTORNEYS

Oct. 26, 1954     N. R. FRIEBERG ET AL     2,692,726
CALCULATING MACHINE FUNCTION CONTROL MECHANISM
Filed April 16, 1953     14 Sheets-Sheet 9

FIG. 9

```
                                                      PAGE

NAME     R E FITZWATER
ADDRESS  24 FARMSIDE DR
```

| DATE | REFERENCE | CHARGE | CREDIT | BALANCE | |
|------|-----------|--------|--------|---------|---|
| | | | BALANCE FORWARD | 100.00 | |
| JAN 2 | 110 | 25.00 | | 125.00 SA | 1 |
| FEB 2 | 220 | 60.00 | | 185.00 SA | 2 |
| FEB 5 | | | 200.00- | 15.00 CR A | 3 |
| FEB 6 | 555 | 5.00 | | 10.00 CR A | 4 |
| | | | | | 5 |
| | | | | | 6 |
| | | | | | 7 |

442 — CHARGE column, 443 — CREDIT column (CREDIT DATA), 444 — BALANCE column

INVENTORS
NELSON R. FRIEBERG
OSCAR F. LARSEN
BY
THEIR ATTORNEYS

Oct. 26, 1954  N. R. FRIEBERG ET AL  2,692,726
CALCULATING MACHINE FUNCTION CONTROL MECHANISM
Filed April 16, 1953  14 Sheets-Sheet 10
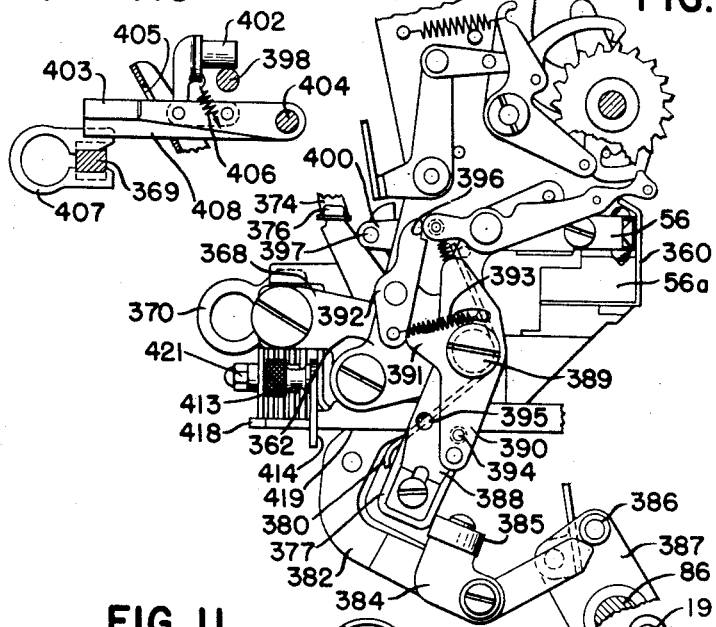
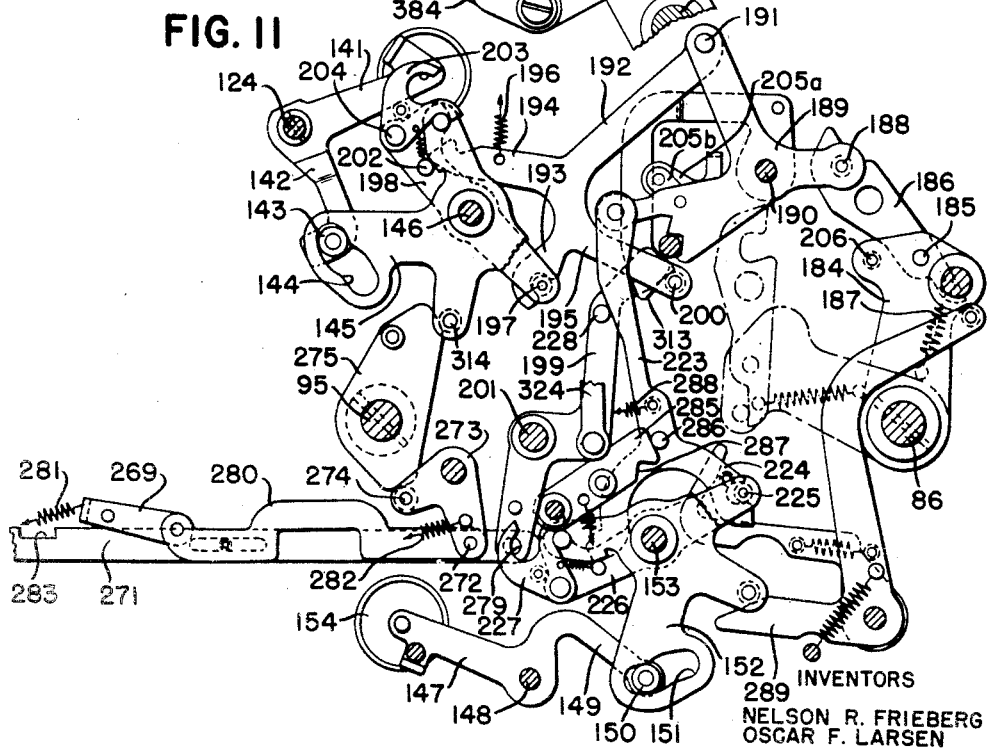
INVENTORS
NELSON R. FRIEBERG
OSCAR F. LARSEN
BY
THEIR ATTORNEYS

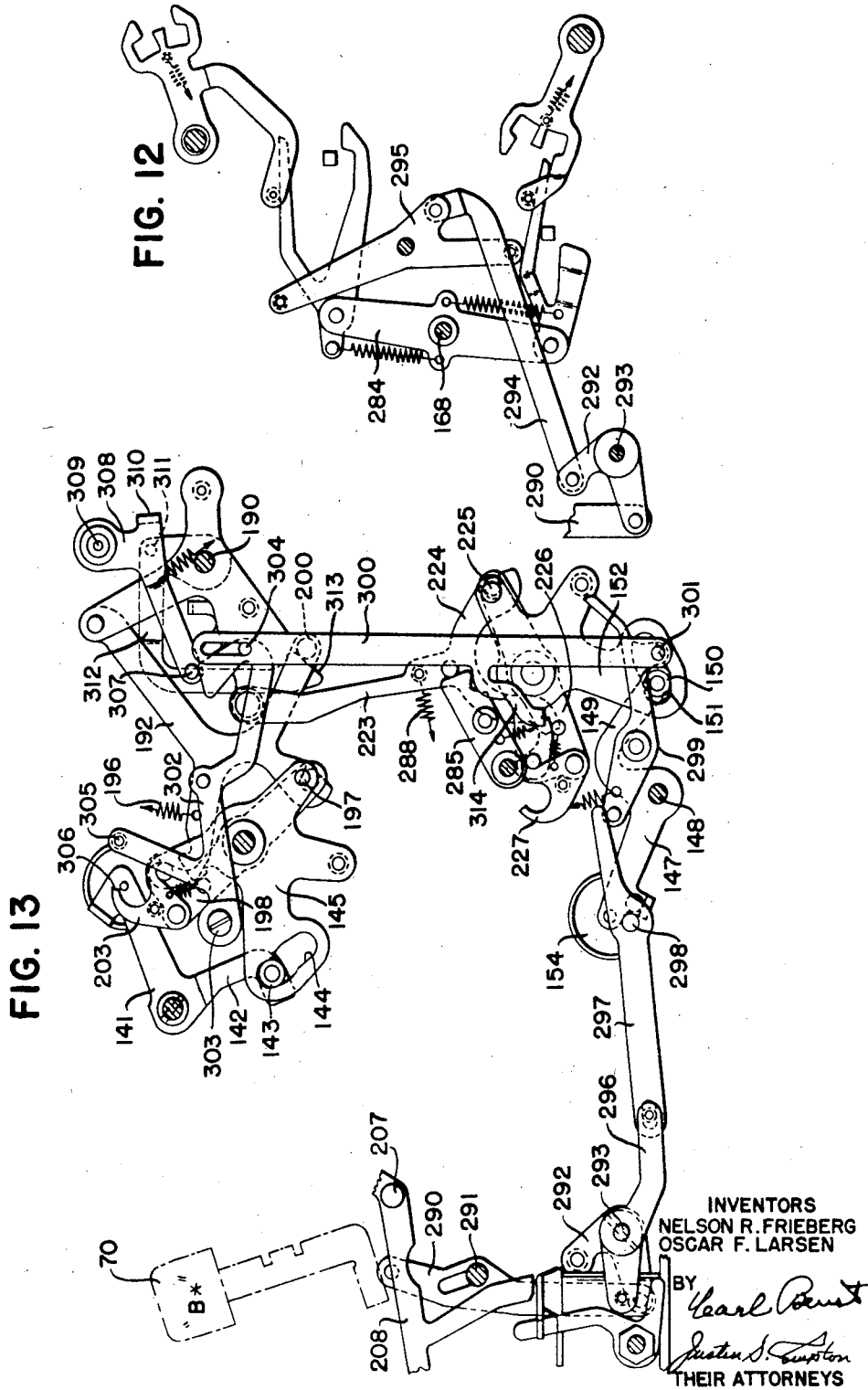

Oct. 26, 1954  N. R. FRIEBERG ET AL  2,692,726
CALCULATING MACHINE FUNCTION CONTROL MECHANISM
Filed April 16, 1953  14 Sheets-Sheet 12

SUBTRACT
NON-PRINT
NON-ADD
DATE PRINT
CIPHER CUT-OUT

INVENTORS
NELSON R. FRIEBERG
OSCAR F. LARSEN
BY
THEIR ATTORNEYS

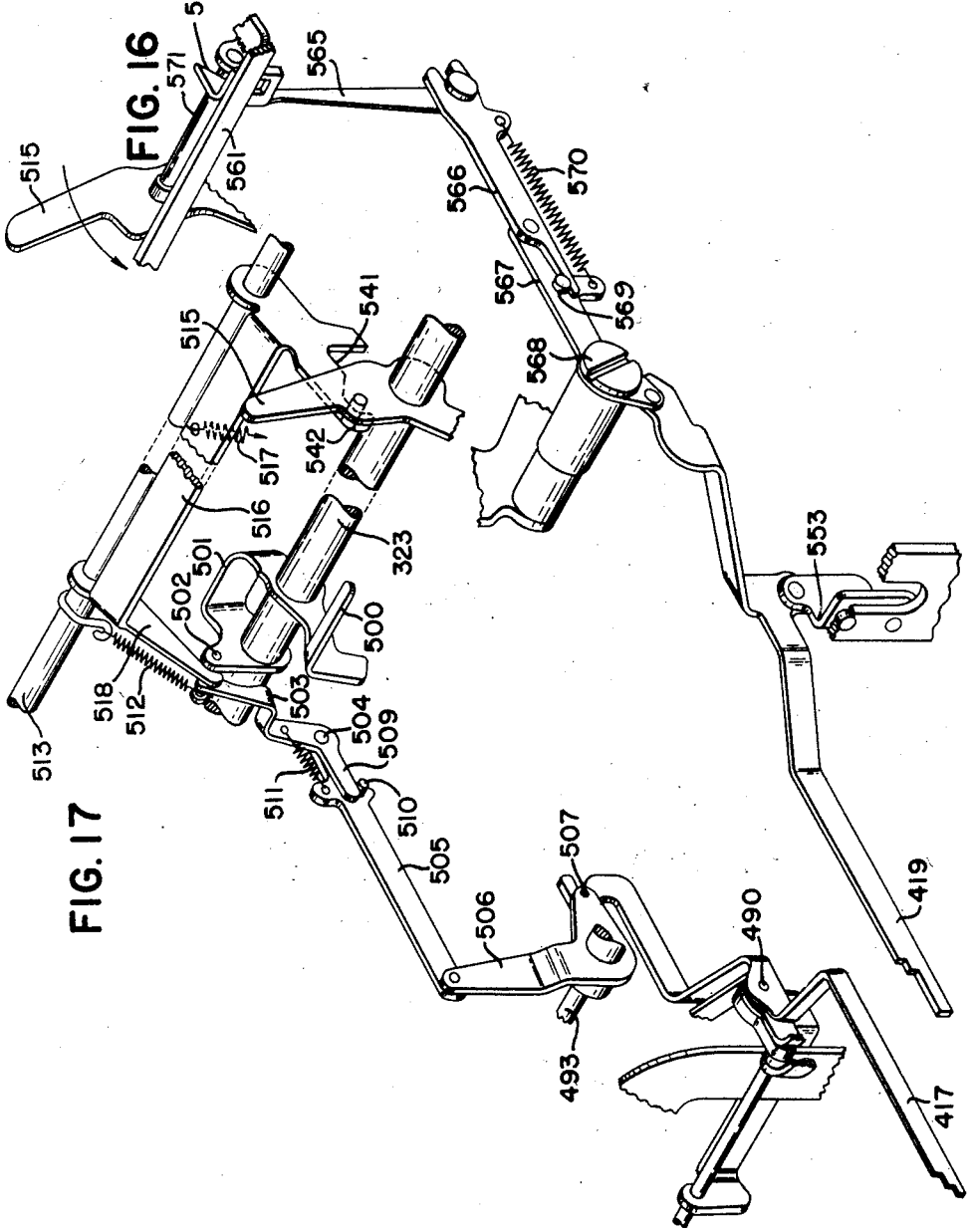

Oct. 26, 1954 N. R. FRIEBERG ET AL 2,692,726
CALCULATING MACHINE FUNCTION CONTROL MECHANISM
Filed April 16, 1953 14 Sheets-Sheet 14
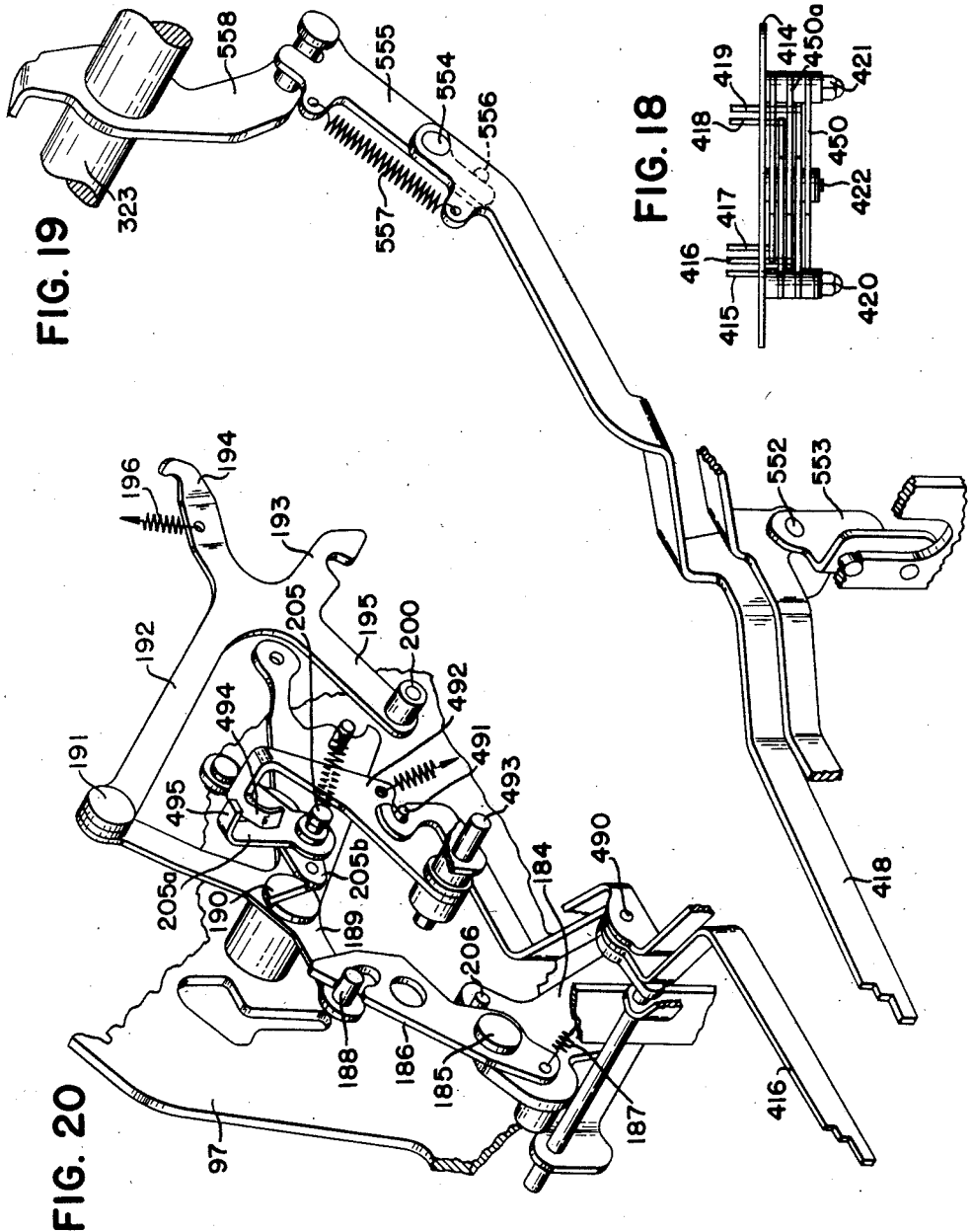
INVENTORS
NELSON R. FRIEBERG
OSCAR F. LARSEN
BY
THEIR ATTORNEYS Patented Oct. 26, 1954

2,692,726

UNITED STATES PATENT OFFICE 2,692,726

CALCULATING MACHINE FUNCTION CONTROL MECHANISM

Nelson R. Frieberg and Oscar F. Larsen, Ithaca, N. Y., assignors to The National Cash Register Company, Dayton, Ohio, a corporation of Maryland Application April 16, 1953, Serial No. 349,228

7 Claims. (Cl. 235—60.15)

This invention relates to a calculating machine, and more particularly pertains to a full keyboard add-subtract bookkeeping machine with a semi-automatic cross-tabulating paper carriage, two totalizers, and controlled machine operation as determined by the position of controls on the paper carriage. The machine also has mechanism by which a carriage-controlled operation may be manually reversed in a particular instance from subtract to add, mechanism by which the main drive of the machine is used to carry out conditions set up by the paper carriage to cause the machine to operate in a particular manner, special printing control mechanism and various controls and interlocks that will become apparent as the machine is described.

Inasmuch as the novel mechanism reaches into practically every part of the machine, and controls the various operations, a considerable showing of old and well known mechanism has been made, and a brief description of it will be given, together with proper references to issued patents and patent applications that show such old mechanisms in more detail, the essential movements of the parts being given here in order that the new mechanism may be fully understood.

It is an object of this invention to provide a bookkeeping machine having a semi-automatic cross-tabulating carriage, with carriage controls and associated mechanism whereby transaction entries of debit and credit amounts may be posted on a customer's account card and on a tape, together with means for proving the entries so made.

It is another object of the invention to provide such a machine, in which certain of the carriage-operated controls operate to set up a condition which is carried out by the main operating mechanism of the machine so that undue load will not be put upon the carriage controls.

With these and incidental objects in view, the invention includes certain novel features of construction and combinations of parts, a preferred form or embodiment of which is hereinafter described with reference to the drawings which accompany and form a part of this specification.

Of the drawings:

Fig. 5 is a sectional view of the mechanism within the right side frame of the machine, and without the paper carriage mechanism.

Fig. 9 is a portion of a typical customer's account record sheet.

Fig. 10 is a portion of a record tape on which is printed the proof of the transaction shown on the customer's record sheet of Fig. 9.

Fig. 11 shows part of the totalizer engaging mechanism with relation to the controls for taking a total.

Fig. 11a is an elevation of the left end of the carriage.

Fig. 11b is a view from the left of part of the tabulating pawl mechanism.

Fig. 12 shows a portion of the mechanism for sensing the totalizer mechanism to determine whether the amount in the totalizer, from which a total is to be taken is positive or negative.

Fig. 13 shows the mechanism by which the ordinary condition, in which a total from the "A" totalizer is taken upon operation of the total-taking mechanism, is changed so that the total is taken from the "B" totalizer.

Fig. 16 shows the mechanism for carriage control of the non-print mechanism.

Fig. 17 shows the mechanism for carriage control of the cipher cut-out mechanism.

Fig. 18 is a top plan view of the cam lever assembly on the carriage.

Fig. 19 shows the mechanism for carriage control of the date and folio printing.

Fig. 20 shows the mechanism for carriage control of the non-add mechanism.

General description

Figure 1:
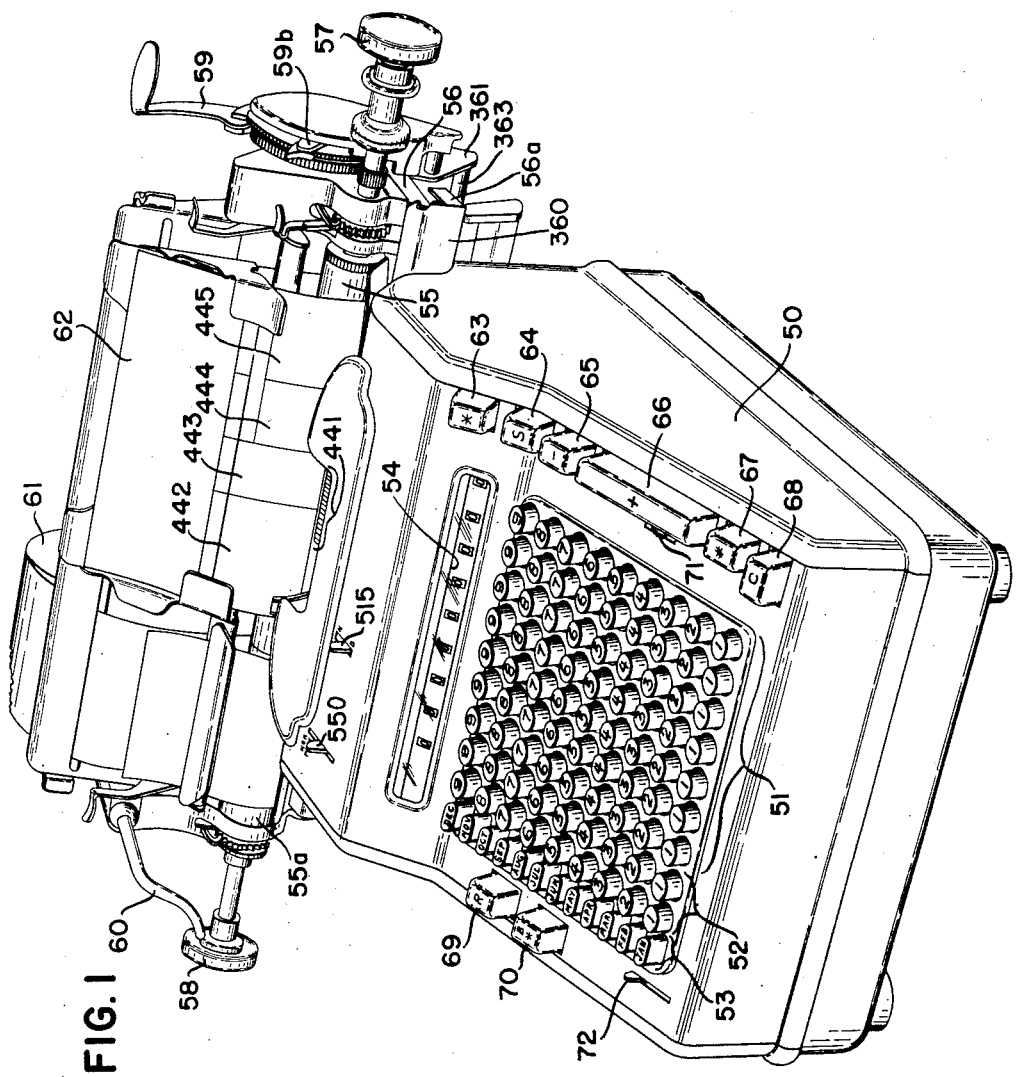
Fig. 1 is a perspective view of the machine.

Referring to Fig. 1, the machine is provided with a casing 50, a plurality of denominational rows of digit keys 51, two rows of day-of-the month keys 52, a row of month keys 53, a sight aperture 54 through which the number drums associated with the upper, or "A," totalizer may be read, a semi-automatic cross-tabulating paper carriage mounted on rail 56 mounted in turn on a frame-supported rail 56a, a customer's record sheet platen 55, and a tape platen 55a, independently rotatably supported by the carriage, the platen 55 being rotatable by the knob 57 and the platen 55a being rotatable by the knob 58. Each platen section has its own vertical paper feeding device, which advances the record material one or more steps at a time for each machine operation, the record advancing devices being constructed so that the feed may be shut off of either one, as desired. The paper carriage also is provided with an injector handle 59, by which the customer's record platen 55 may be quickly rotated throughout a movement which will adjust the customer's record to the recording area by one forward movement of the handle 59, there being an adjusting device 59b to regulate the throw of this handle. The record feeding and injecting devices will not be described specifically, as such mechanisms have long been known in the art.

The carriage also is equipped with a carriage return lever 60, by which the carriage is moved to the right at the end of a line of entries, the lever 60 acting to advance the record material tape a step for each return movement of the carriage. The preferred operation of the machine is as shown with the tape 61 on the left and the customer's record 62 on the right, although the carriage control elements are adjustable to reverse the order. There is also provided a total control key 63, operation of which sets the machine into a two-cycle total-taking operation, a sub-total key 64, operation of which sets the machine into a two-cycle sub-total operation, both of said keys normally taking the total or sub-total from the upper or "A" totalizer. A key 65 is provided for entering into the totalizers amounts set up on the keyboard negatively, that is to say, it is a subtract key. The add key 66, or add motor bar, when operated, enters into the totalizers, positively, the amount set up on the digit keys. Key 67 when operated causes a machine operation in which is printed the amount set up on the digit keys but does not enter such amount into the totalizers. The key 68 is a correction key for restoring depressed keys to normal. Key 69 is a "Reverse" key which, in the event a carriage control element for subtraction, to be described, calls for a subtract operation, reverses the operation to an add operation. Key 70, when depressed, followed by depression of either the total key 63 or the sub-total key 64, causes the machine to take a total or sub-total, as the case may be, from the "B" totalizer. Lever 71, when moved to operated position, disables the key restoring mechanism, to be described, so that an entry set up on the keys may be entered repeatedly by repeated operation of the add motor bar 66 or the subtract key 65. Lever 72, when operated, disables the key restoring function for the date keys 52 and 53 so they will not be restored to unoperated condition at the end of machine operation. Lever 515 controls the date printing mechanism to function or not, and lever 550 when moved to operative position disables the printing hammers.

The further explanation of the functions of the various described elements of the machine, insofar as is applicable to an understanding of the novel construction claimed, will be given later on.

Figure 2:
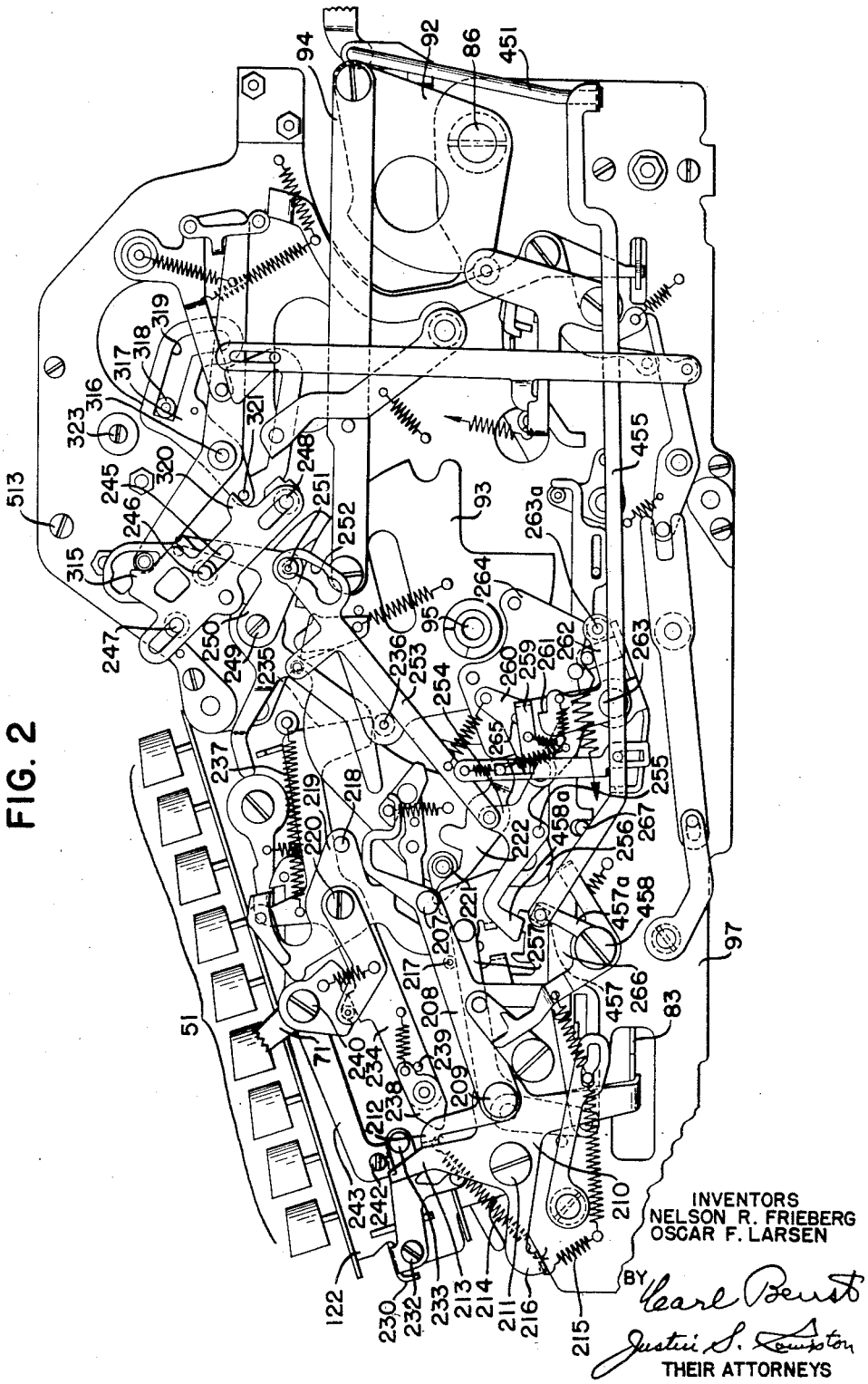
Fig. 2 is a right side elevation of the machine with the case removed, and without the paper carriage mechanism.
Figure 3:
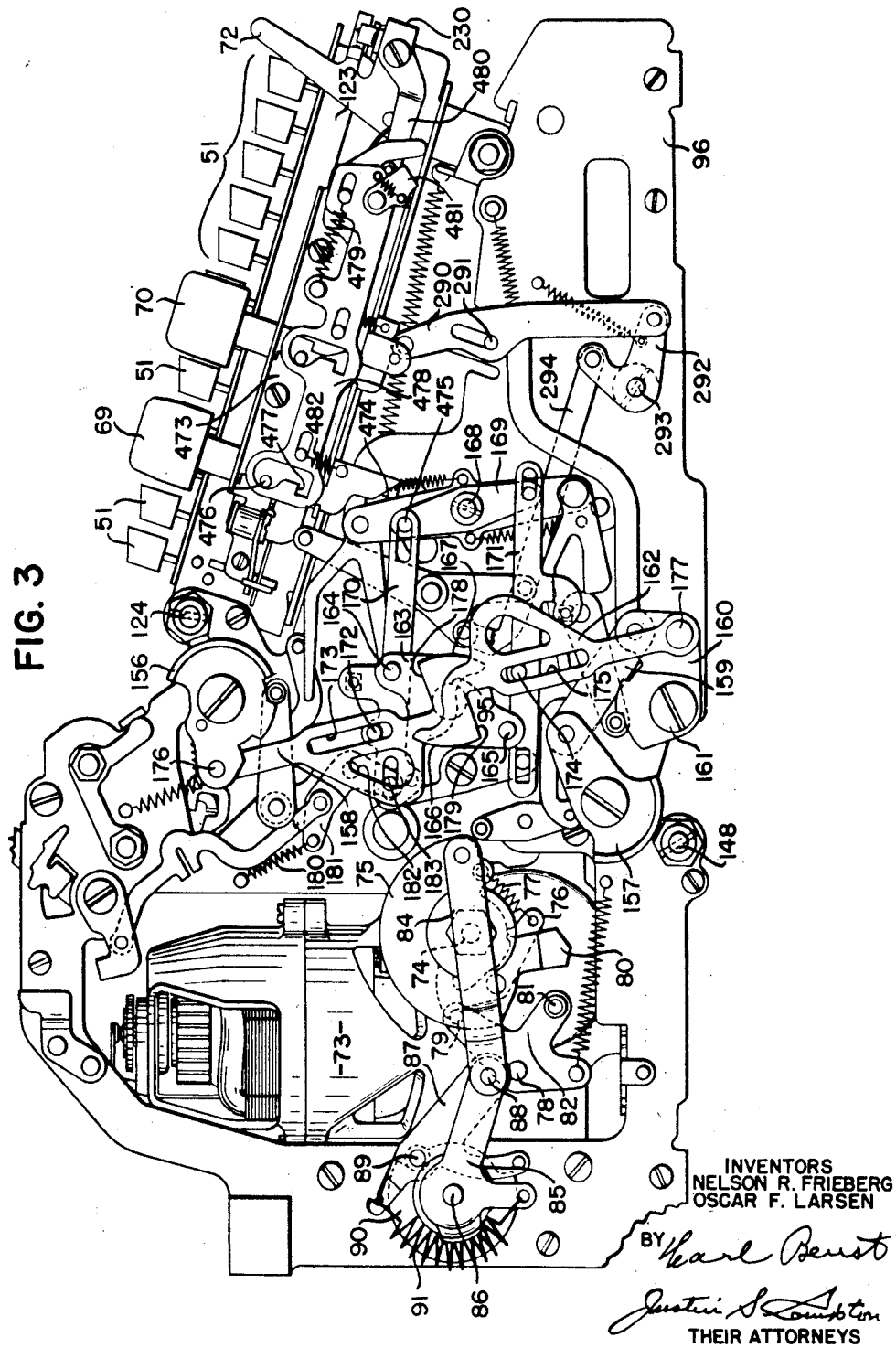
Fig. 3 is a left side elevation of the machine with the case removed, and without the paper carriage mechanism.

Referring to Fig. 3, the machine is driven by an electric motor 73, which, when operated, turns a shaft 74 through reduction gearing. Rotatably mounted on shaft 74, is a front crank plate 75 and behind front crank plate 75, and secured to shaft 74, is a notched wheel, not shown, which is adapted to be engaged by a tooth on a pawl 76, pivoted to plate 75 and urged in engaging direction with the notched wheel by a spring 77. There is provided a trip lever shaft 78 having secured thereto a three-armed lever 82, which, when the machine is tripped, moves in a counterclockwise direction, as viewed in Fig. 3, to close the motor switch and release the pawl 76 to the action of spring 77, as stud 79 moves away from it. The motor will then start, turning the plate 75 in a counter-clockwise direction for one rotation, the arm 80 on plate 75 striking stud 81 on three-armed lever 82, knocking lever 82 clockwise to put stud 79 in the path of the upper end of pawl 76, as it reaches home position, disengaging plate 75 from motor shaft 74, thus causing the plate 75 to perform the single rotation. The machine is tripped through the forward motion of link 83 (Fig. 2), as is fully described in the application for United States Letters Patent of Roland G. Fowler et al., Serial No. 237,758, filed July 20, 1951, to which reference is made for a more specific description of the machine tripping mechanism. One-cycle operations are performed for addition or subtraction, and two-cycle operations are performed for taking a total or a sub-total. One rotation of plate 75 is equivalent to one machine cycle. In two-cycle operations the link 83 of Fig. 2 is kept pulled forward until after the second cycle of operation commences. Plate 75 is connected by pitman 84 to a rear crank plate 85 which is loosely mounted on the main drive shaft 86 which extends across the rear of the machine. In one rotation of plate 75 the crank plate 85 is rocked first clockwise and then counter-clockwise, as seen in Fig. 3. The rear crank plate 85 is coupled to the main drive shaft 86 through lever 87 pivoted to crank plate 85 at 88. Lever 87 has a stud 89 which is held in a notch of a plate 90 secured to shaft 86 by a spring 91, extending between the outer end of lever 87 and an arm of crank plate 85, so that the oscillatory motion of the crank plate 85 is yieldingly given to shaft 86, any overload on shaft 86 resulting in stud 89 escaping from the notch in plate 91. The parts are restored automatically when the overload is removed, when the plate 75 is returned to normal position.

Referring to Fig. 2, which is an elevation of the right side mechanism, the main drive shaft 86 has secured thereto a plate 92 pivotally coupled to a main drive plate 93 by a link 94. Plate 93 is pinned to a cross shaft 95 extending between and journaled in the side frame plates 96 and 97. Upon commencement of a cycle of machine operation both plates 92 and 93 will move counter-clockwise, as seen in Fig. 2, and on the second half of the machine cycle they will return to their home position.

Figure 4:
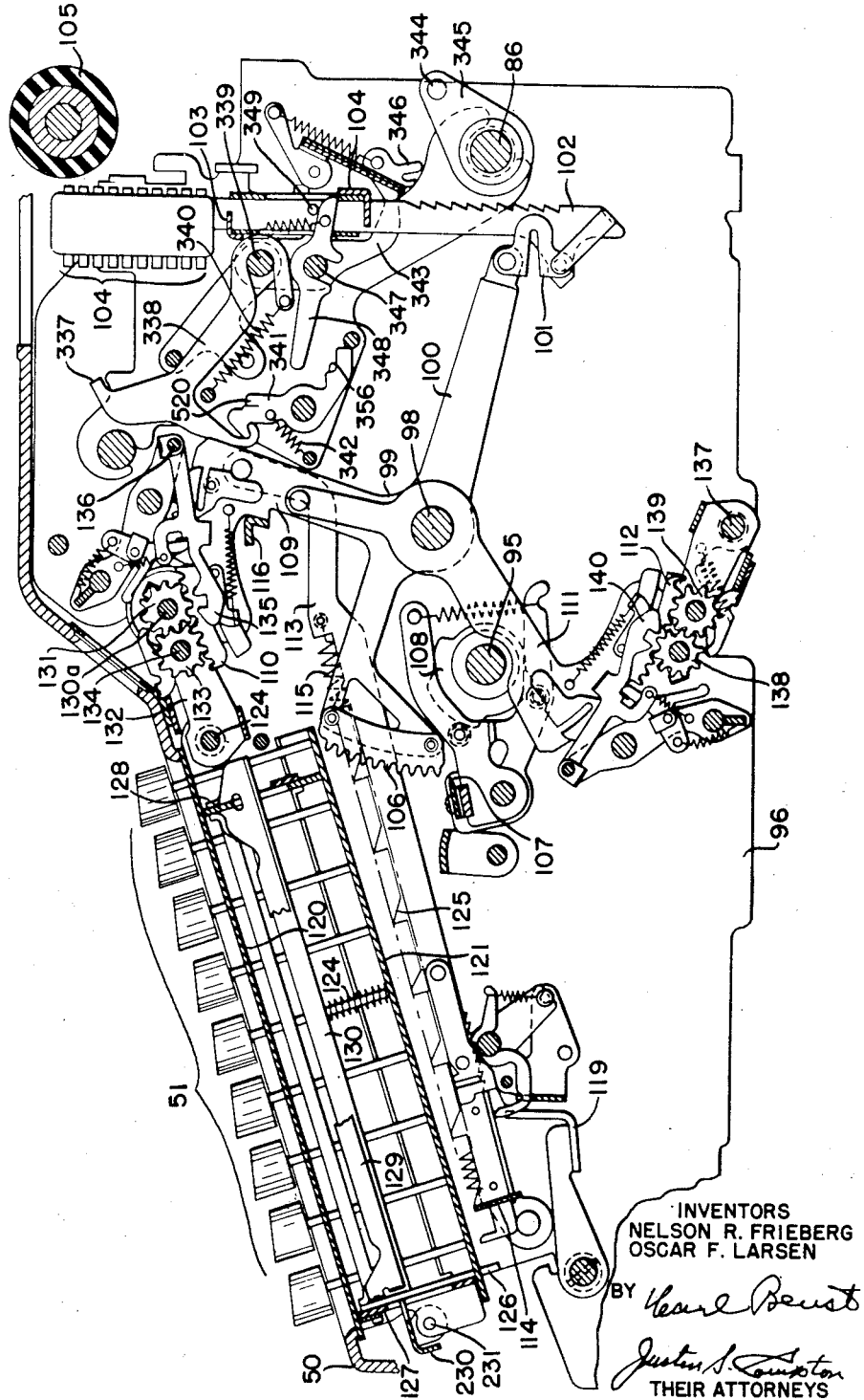
Fig. 4 is a section through a typical denominational order of the machine, showing the keyboard, the differential mechanism, the totalizer mechanism, and the printing mechanism, but without the paper carriage mechanism.

Referring to Fig. 4, which is a section through the machine from front to back, through a typical denominational order of the machine, extending across the machine between the left side frame plate 96 and the right side plate 97 (see Fig. 2), is a shaft 98, on which are mounted, in equally spaced relation across the machine, a series of denominational order diverging levers, such as lever 99, each having a rearwardly extending arm 100, coupled by an adjusting link 101 to a printer bar 102 mounted in guides 103 and 104 for vertical movement to position one of the type 104 opposite the printing station in front of the paper platen 105, shown diagrammatically. On a forwardly extending arm of each diverging lever 99 is a rack 106 whereby when the associated lever 99 is moved counter-clockwise in a machine operation, as will be described, an aligning bar 107 moving in a direction to engage one or another of the teeth of rack 106 at mid-cycle by rotation of cam 108 on shaft 95, will hold the lever in accurately aligned position during the ensuing printing operation, which occurs after such alignment. On an upwardly extending arm 109 of each lever 99 is mounted an upper, or "A," totalizer-wheel-actuating rack 110, by pin and slot connections, which allows a unit of movement for the entry of carry-over data from the next lower order, as will be explained, and on a lower extending arm 111 of diverging lever 99 is a similar rack 112, similarly mounted for actuation of the lower or "B" totalizer wheel associated with the particular denominational order. Pivoted to the upper arm 109 of each diverging lever is a stop bar 113, the front end of which is slidably mounted in a slot in a guide comb 114 extending across the machine, at the front thereof, the stop bar 113 being urged forwardly by a spring 115 extending between the stop bar and the comb 114, urging the associated diverging lever 99 in a counter-clockwise direction. All of the diverging levers are kept, normally, in a home position by a bail 116, which extends across them all. Bail 116 is supported by two arms pinned to shaft 98, the right arm 117 being shown in Fig. 5. The lower end of arm 117 is pivoted to a link 118 having a bifurcated rear end which embraces and rides on main drive shaft 86. Link 118 has a roller 119 thereon which rides the periphery of a cam 120 pinned to the shaft 86. As shaft 86 moves, in the first half of the cycle, counter-clockwise, the low part of the cam is presented to roller 119, allowing link 118 to move rearwardly causing the bail arms to rotate counter-clockwise, which permits all the stop bars to move forwardly unless prevented by the keys, to be described, or by the zero stop elements, to be described, in the event no keys are operated, or by a stop bail 119, which is moved to an effective position to stop the forward movement of all the stop bars during the first cycle of a total operation or of a sub-total operation, or by the totalizer wheels on being returned to zero. On the last half of a machine cycle, as the shaft 86 moves clockwise to home position, the bail 116 brings all the diverging levers and stop bars to home position.

Referring to Figs. 3, 4 and 5, the key bank unit includes a top plate 120, a bottom plate 121, a right side plate 122, and a left side plate 123, fastened together to form a box-like unit, which is supported at its rear end on cross shaft 124, and supported at the front end by studs, such as stud 125 (Fig. 5) secured on the inside of the side frame plates. The digit and date keys are slidably mounted in aligned slots in the top and bottom plates and each key is normally kept in an up, or restored, position by its individual spring 124 (Fig. 4). As seen in Fig. 1, in the particular embodiment of the invention, there are nine rows of digit keys with nine keys in each row, and a leftmost row of twelve keys representing months of the year, there being twelve keys in this row. As a key is depressed, its stem moves below the bottom plate 121 of the key bank unit into the path of movement of one or another of associated stop lugs 125 (Fig. 4) on the associated stop bar. Those stop bars for the digit key banks are equipped with a number of lugs spaced so that when a digit key of a given value, from "one" to "nine", is depressed, the associated stop bar can move only a distance equal to the value of that key in the ensuing machine operation. The month key row has a special stop bar adapted for twelve steps of movement, and the associated diverging lever has no upper and lower arms, as the movement of its diverging lever is transmitted only to the associated printer bar, which has twelve type therein, representing the months, and that type representing a particular month type is positioned at printing position by control of the associated month key during an operation of the machine. The construction of the key bank is such that a key is latched in depressed position until the end of a machine operation, and then released, to be restored by its spring 124. The depression of a key moves to one side from in front of the associated stop bar, the conventional zero stop element 126, which otherwise would hold the stop bar to a very short movement during a machine operation, only sufficient to bring the zero type associated therewith to the printing station, the coupling of the associated totalizer racks to the diverging levers being such that such small "zero" movement is allowed before any movement of the associated totalizer wheels can take place. Running along each side of a row of key stems is a swinging shutter or bail, the one on the left-hand side of the row being for the purpose of latching down a depressed key, the edge of the shutter cooperating with formations on the left edge of each key stem for that purpose, the swinging aside of the shutter by a formation on the downward motion of a key, releasing any other depressed key, forming a so-called flexible keyboard. The right bail or shutter is the zero stop member, and formations on the right side of each key cause the bottom of the zero stop shutter to move outwardly from a key when depressed, the shutter being retained in that position as long as such associated key is depressed. The forward end of the zero stop shutter has depending the "zero stop" element 126 (Fig. 4) which by the outward movement of the shutter is moved out of the path of the associated stop bar. These shutters are pivoted in the front plate 127 and in the rear plate 128 of the key bank unit, and are urged into contact with the sides of the associated key by springs (not shown). In Fig. 4 the shutter 129 is the key latch shutter for the bank of keys next to the right of that bank of keys shown in Fig. 4, and shutter 130 is the zero stop shutter situated on the right of the keys of Fig. 4 and cooperating therewith. The latching shutter for the keys of Fig. 4 is behind the shutter 130, and cannot be seen. Consequently, the depending zero stop element 126 shown in Fig. 4, cooperates with the stop bar next to the right of that one shown in Fig. 4, but the construction and function of the parts can be understood from what has been described. For a more specific disclosure of the keyboard construction reference is made to United States Patent No. 2,062,731, which issued on application of Charles Schroder, December 1, 1936. The totalizers are both of the same construction, and for a description of construction, in brief, consideration will be given to the upper, or "A," totalizer.

The shaft 124 (Figs. 3, 4 and 5), which is journaled in the side plates of the machine, for lateral shifting, to an add position in the right direction, and to a subtract position in the other direction, has mounted on either end thereof, just inside the side frame plates 96 and 97, totalizer support arms, the outer ends of which hold a shaft 130a (Fig. 4), on which are rotatably mounted, at intervals across the machine, corresponding to the spacing of the diverging lever racks, totalizer pinions 131 which normally are in line with the associated racks on the diverging levers when in add position, the shaft 124 normally being in rightmost position. Completing the totalizer framework are plates, such as plate 132, which are secured to shaft 124 and supported at the outer ends by pinion shaft 130. One of these plates 132 is positioned between each two totalizer wheels, and each supports on a stud 134 an idler wheel 133, each of which has two sets of teeth side-spaced, with an annular groove there-between, one of the sets of teeth being in mesh with the totalizer pinion with which it is associated, and the other of the sets of teeth being in line with the associated racks when shaft 124 and, consequently, the totalizer framework is in subtract position to the left so that the entry of items will be given to the totalizer pinions in a direction the reverse of that in adding operations. Each of the totalizer pinions has two transfer cams thereon, one which is in line with an "add" formation on the associated transfer pawl 135, when the totalizer is in add position and the other of which is in line with a "subtract" formation on the associated transfer pawl when the totalizer is in subtract position. These cams cause the transfer pawl associated with a given totalizer pinion to rock around the supporting rod 136 when the associated totalizer pinion passes through zero, going in either a negative or a positive direction. These cams also act as stops to stop the totalizer in a zero position, as a total or a sub-total is being taken. The rocking down of transfer pawl 135 on an entry passes on a carry-over unit of one to the next higher totalizer wheel in the manner shown in application for United States Letters Patent, Serial No. 323,462, filed by Nelson R. Frieberg and Oscar F. Larsen on December 1, 1952, to which application reference is made for a more specific disclosure of the totalizer and other before-mentioned mechanisms of this machine, the explanation given herein being sufficient for an understanding of the invention.

The lower, or "B," totalizer is supported on shaft 137, and includes a set of totalizer pinions 138 and associated idler pinions 139. This lower totalizer also has a set of transfer pawls 140, which act in the same manner as that given in connection with the upper totalizer.

The right totalizer support arm 141 (Fig. 5), for the upper, or "A," totalizer has a downwardly extending arm 142, having a stud 143 which extends into a cam slot 144 in totalizer engaging plate 145 which is rockably supported on frame-supported stud 146. The rocking of cam plate 145 clockwise around its stud 146, from the position shown in Fig. 5, will disengage the associated totalizer from the diverging lever racks with which it is normally engaged when the machine is at rest.

Similarly, the lower, or "B," totalizer has a right supporting arm 147 secured to lower totalizer supporting shaft 148, said arm having a rearwardly extending portion 149, with a stud 150 riding in a cam slot 151 of lower totalizer engaging plate 152 mounted on stud 153. Clockwise rotation of the plate 152 will disengage the normally engaged lower totalizer wheels from the associated racks. The upper totalizer has associated with each totalizer pinion a number drum 155 on the periphery of which are numbers which correspond to the position of the wheel, which drums thereby exhibit the accumulated data which may be viewed through the viewing aperture 54 (Fig. 1) in the casing. In a similar manner the lower totalizer has number drums 154 thereon, but they are invisible, being within the machine.

Figure 14:
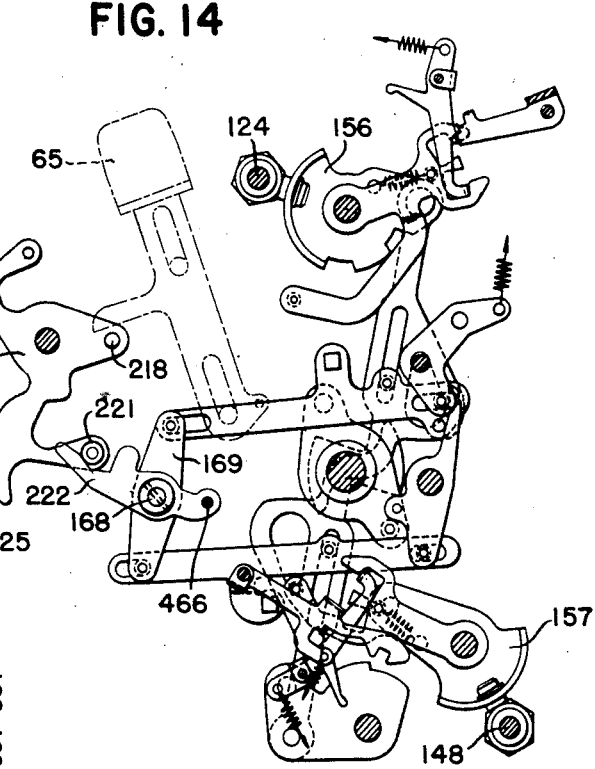
Fig. 14 shows a portion of the subtract control mechanism.

Referring to Fig. 3, the shifting of the totalizers for addition or subtraction is accomplished by cam 156 for the upper totalizer and cam 157 for the lower totalizer. These cams each have an edge portion in which a cam slot is cut, the cam slot embracing a stud which extends radially from each of the associated totalizer supporting shafts 124 and 148. As seen in Fig. 3, if cam 156 is turned counter-clockwise by pulling down on lever 158 pivoted thereto, the shaft 124 is moved to the left to put the idler pinions of the upper, or "A" totalizer in alignment with the associated diverging lever racks, and the counter-clockwise movement of cam 157 will do likewise with the lower totalizer. Cam 157 is turned through link 159 pivoted to the cam at one end and at the other end to plate 160 pivoted to the frame at 161, which in turn has pivoted thereto a lever 162 corresponding to lever 158. Upward movement of lever 162, from the position shown, moves the cam 157 counter-clockwise. Secured to the left end of shaft 95, which is rocked first clockwise, as seen in Fig. 3, on the first half of a machine cycle, and then counter-clockwise on the second half of a machine cycle, is pinned a plate 163, having thereon studs 164 and 165, which cooperate with surfaces on levers 158 and 162, respectively. In the position of the elements shown in Fig. 3, the oscillation of plate 163 during a machine cycle has no effect on levers 158 and 162 and their respective cams because stud 165 will move around the arcuate surface 166 and stud 164 will move around arcuate surface 167, and thus the totalizers are left in the add position. Extending across the machine, and journaled in the side frame plates is a subtract shaft 168 (see also Figs. 8 and 14), to the left end of which is pinned a lever 169, which is shown in Fig. 3 in the add position. On subtract operations, either under control of the subtract key 65 (see Fig. 1) or under control of the carriage operated lever 415 (see Fig. 8), the lever 169 is rotated clockwise, slightly, as seen in Fig. 3, pulling forward on a link 170 coupled to lever 169 by a pin and slot connection, and moving rearward a link 171 also coupled to lever 169 by a pin and slot connection. At the rearward end of link 170 there is mounted a stud 172, which rides in a slot 173 in lever 158, and at the rear end of link 171 is a stud 174, which rides in a slot 175 in link 162. Upon the subtract movement of shaft 168 occurring, lever 158 moves counter-clockwise around its pivot 176 and link 162 moves clockwise around its pivot 177. Under the circumstances, when the machine operation is started, stud 164 will engage surface 178 of lever 162, and stud 165 will engage surface 179 of lever 158, and will pull lever 158 downwardly and pull lever 162 upwardly, shifting both totalizers to their subtract positions. Since, as will be made apparent later, a considerable force is required to shift the elements just described, a means has been provided whereby control of the subtract mechanism from the carriage controlled elements is taken over by the motor driven mechanism through a condition set up by the carriage, such mechanism constituting one of the novel features of the invention. Such power driven subtract control conditioning of the machine does not interfere with the normal function of the subtract key in bringing about the same subtract condition of the totalizer shifting elements by manual pressure on the subtract key 65, as is shown in Fig. 14, and as will be later described. At the conclusion of a subtract operation the lever 169 (Fig. 3) is returned to its normal add position at the end of the machine cycle, by springs, one of said springs 180 acting to rock a bell crank lever 181 pivoted at 182 to the left side frame 96 and having on its downwardly extending arm a stud 183, which is positioned within a slot in the rear end of link 170, tending to pull it rearwardly.

In entering an amount into the machine, the amount is first set up on the digit keys and, if the amount is to be entered additively, the add motor bar 66 (Fig. 1) is depressed, setting the machine into operation. The stop bars 113 are given a forward excursion of movement during the first half cycle and a homeward excursion during the second half of the machine cycle, the stop bars being stopped by the zero stop elements or the digit key stems, as the case may be. Inasmuch as amounts are entered into the totalizers on the last half of a machine cycle, the totalizers are both disengaged at the beginning of a machine cycle in the manner next to be described.

Referring to Figs. 11 and 20, as the main drive shaft 86 starts moving counter-clockwise, as seen in Fig. 11, a lever 184 secured thereto moves in a like manner. Pivoted to the outer end of lever 184 at 185 is a hook lever 186 normally urged into a position radial to shaft 86 by a spring 187. Lever 186 has on the outer end thereof a hook formation which normally engages a stud 188 on a rearwardly extending arm of three-armed lever 189, pivoted to the frame of the machine at 190. Pivoted to an upwardly extending arm of lever 189 at 191 is a pitman 192 having a downwardly extending arm 193, a forwardly extending arm 194 and a rearwardly extending arm 195. Pitman 192 is normally urged in a clockwise direction, as seen in Fig. 11, around pivot 191 by a spring 196. The downwardly extending arm 193 has a hook which normally embraces stud 197 on a lever 198 pivoted on stud 146, and is caused to keep in engagement with stud 197 by reason of the upper end of a total control lever 199 bearing against the stud 200 on the rearwardly extending arm 195 of pitman 192.

On total-taking and sub-total-taking operations the total control lever 199 is rocked counter-clockwise around its pivot 201, releasing pitman 192 to the action of spring 196, as will be described in connection with total-taking and sub-total-taking operations. To go back to item-entering operations, a stud 202 on lever 198 bears against an upper arm of totalizer engaging cam plate 145 so that clockwise movement of lever 198 will rock the totalizer engaging cam plate 145 in the same direction, disengaging the "A" totalizer. A hook 203 pivoted to lever 198 at 204 ordinarily couples lever 198 to cam plate 145 so that when lever 198 moves counter-clockwise it carries cam plate 145 with it. However, in other than item entries, the lever 198 may be disengaged from cam plate 145 by moving hook 203, as will be later described. At the commencement of a machine cycle of an item-entering operation the lever 184 rocks counter-clockwise causing, through lever 186, the lever 189 also to rock counter-clockwise, which forces pitman 192 downwardly and forwardly to rock the cam plate 145 clockwise, disengaging the upper, or "A", totalizer. At about mid-cycle lever 184 comes to the position shown in dotted line where lever 186 has been forced out of its normal radial position by reason of striking a stud 205 (see Fig. 20 also) on bell crank 205a pivoted to a bracket 205b secured to lever 189, the lever 186 rocking clockwise until a tail thereon strikes stud 206 on lever 184, causing lever 186 to become blocked against further clockwise movement. When this happens the lever 189 is rocked back to home position, carrying pitman 192 upwardly and rearwardly, and reengaging the upper totalizer with the racks of the associated diverging levers. As the stop bars are returned to home position, the amount set up on the digit keys is set up on the totalizer additively. The foregoing entry operation, if additive, is initiated by depressing the add motor bar 66 (Fig. 1), which bears down on stud 207 (Fig. 2) on a lever 208, pivoted at 209 to a four-armed trip lever 210 pivoted to the machine side frame at 211. An upper extending arm 212 of a lever 257 also pivoted at 209 to lever 210 has a bent-over ear which rests against the rearward edge of an upwardly extending arm 213 of lever 210, and is held in that position, resiliently, by a spring 214 extending between said arm 212 and the machine frame. A spring 215 keeps the bent-over ear on a forwardly extending arm 216 of lever 210 in contact with the upper edge of right side plate 97. A downwardly extending arm of lever 210 is pivoted to link 83, before mentioned. Lever 208 has a stud 217 which rests on top of the rearwardly extending arm of lever 257. The result is, as the add motor bar presses down on stud 207, four-armed lever 210 is rocked, slightly, clockwise, initiating a cycle of machine operation. If the item set up on the keyboard is to be subtracted, the subtract motor bar key 65 (Figs. 1 and 14) is depressed, which presses down on stud 218 on subtract plate 219 pivoted at 220 to the right side plate 122 of the key bank unit. The under side of stud 218, in turn, bears down on the rearwardly extending arm of lever 208 (Fig. 2), with the result that the machine is set into operation, as with the add motor bar. The subtract plate 219 has a downwardly and rearwardly extending arm (Fig. 14), which has thereon a stud 221 which, when plate 219 is rocked clockwise by the subtract key 65, strikes the forward end of a lever 222, which is secured to subtract shaft 168 (see Fig. 3), rocking it counter-clockwise as seen in Fig. 14, or clockwise as seen in Fig. 3, setting up the levers 158 and 162 in subtract position to cause the "A" and the "B" totalizers to be shifted to the left during the first half of the ensuing machine cycle so the amount set up on the keys will be entered subtractively.

The "B" totalizer is disengaged and engaged with the associated racks in item-entering timing in the same manner as the upper totalizer through pitman 223 (Fig. 11) which is pivoted to three-armed lever 189, said pitman having a hooked arm 224 which normally is held in engagement with a stud 225 on lever 226, pivoted to the side frame at 153, by stud 228 on lever 193, said lever 226 having a hook 227 by which it is normally connected to cam plate 152. The cam plate 152, in response to the movement of pitman 223, rocks clockwise at the beginning of the machine cycle, and back to normal position just before mid-cycle.

From the foregoing it will be understood that on item entries, items, whether items of addition or subtraction, are entered into both the "A" and the "B" totalizers on such operations, there being no choice.

As will be explained later, the carriage is provided with elements which operate on certain linkages in the machine, when the carriage is at certain positions, to control the subtract mechanism so that the entry of digits set up on the keyboard will be subtracted in both totalizers, even though the add motor bar is used. Furthermore, there is provided a "Reverse" key 69 (Fig. 1) to overcome the control of the carriage over the subtract mechanism, so that even though the carriage controls call for a subtract entry, the "Reverse" key, if operated, will prevent the entry from being a subtract entry.

To release depressed keys at the close of a machine operation, so that they may be restored for use in a subsequent operation, there is provided a key release bail 230 (Figs. 2, 4 and 5) which extends across the front of the machine and is supported for rocking motion by pivots 231 (Fig. 4) and 232 (Fig. 5). By rocking the key release bail by pressing downwardly on the stud 233 (Fig. 5) a series of fingers along the bail will push aside the lattching shutters releasing the keys.

Referring to Fig. 2, on the right side plate 122 of the key bank unit is pivoted, at 220, a key release lever 234, which has on its rear end a downwardly extending tail 235 which normally rests on stud 236 on drive plate 93 and is resiliently held there by a spring 237. As the machine operation commences, and the plate 93 rocks counter-clockwise, the lever 234 will rock clockwise under the urge of spring 237 and a by-pass pawl 238 on the front end of lever 234 will strike and by-pass stud 233. On the return of plate 93, on the second half of the machine cycle, the by-pass pawl 238 being held against clockwise movement by stud 239 will strike stud 233 solidly, rocking the key release bail to release the depressed keys. Repeat lever 71, when moved clockwise around its supporting stud 240 bears down on the upper edge of key release lever 234, preventing it from making its excursion of movement, thus leaving the keys as they were for an ensuing machine operation, which may be repeated as many times as the add motor bar or the subtract motor bar is operated. The key release bail is also rocked in the first cycle of two-cycle, total-taking and sub-total-taking operations by a lever 241 (Fig. 5) and is retained in that rocked position until the second cycle, so that any keys that happen to be depressed before a total-taking operation or a sub-total-taking operation will be automatically released, so as not to interfere with the proper taking of the total. The correction key 68 (Fig. 1), when depressed, bears down on a stud 242 (Fig. 2) on a lever 243, pivoted at 249. The downwardly extending front end of lever 243 bears against stud 233 of the key release mechanism, the depression of said correction key 68 thereby causing the release of any depressed keys, so that incorrect values set up may be removed.

The "Non-Add" key 67 (Fig. 1) operates mechanism including link 244 (Fig. 5) and associated mechanism to create a condition within the machine whereby in an operation of the machine, an amount set up on the keyboard is not added into the totalizers, because they are disengaged by the machine during the first part of the first half-cycle and not reengaged until the end of the second half-cycle of operation. The movement of link 244 also sets the machine in operation to set the printing elements to indicate that the item printed was non-added. The mechanism for doing this will not be described further, and attention is directed to the mentioned Frieberg et al. application, Serial No. 323,462, for a complete disclosure of the aforesaid manually controlled non-add mechanism. The automatic non-add mechanism controlled by the traveling paper carriage is entirely separate and different from the manually controlled mechanism.

In taking a total, the "Total" key 63 (Fig. 1) is depressed, and a foot thereon strikes a stud 246 (Fig. 2) on a slide plate 245, mounted by pin and slot couplings on pins 247 and 248, causing downward movement of the slide, and clockwise movement of a bell crank lever 250 around its stud 249. Bell crank lever 250 has a stud 251, which normally rests in a notch in the top of a slot 252 in total link 253 pivoted at its lower end to total control plate 254 pivoted to the right side frame plate. Several things then occur; first stud 255 bears down on arm 256 of lever 257, thus rocking the trip lever 210 slightly clockwise, which starts a machine cycle; second, the rocking of total control plate 254 causes a latch 259 pivoted to plate 260 to fall behind shoulder 261 on bell crank lever 262. The bell crank lever 262 is pivoted to the right side frame plate at 263, as is plate 260. The rearwardly extending arm of the bell crank 262 has a stud 263a which rides the lower edge of a cam plate 264 secured to the drive plate 93. At the beginning of a machine cycle, as plate 93 rocks counter-clockwise, the bell crank 262 will be rocked clockwise and carry with it plate 260 because latch 259 is behind shoulder 261. Plate 260 has a stud 265 pivoted to the upwardly extending rear end of a link 266, which is, by the rocking of plate 260 clockwise, drawn rearwardly, causing rearward movement of a stud 267 (see Fig. 5) which is on the lower end of a bell crank lever 268, rocking the bell crank lever counter-clockwise. A stud 270 on a latch 269 pivoted on a link 280 rests on the forwardly extending arm of bell crank lever 268, and is normally held upwardly so that latch 269 does not ride on top of the link 271. The link 271 is supported at its forward end by being pivotally coupled to lever 241, before mentioned, and is urged forwardly by a spring 277. The rear end of link 271 is pivoted at 278 to the lower extending arm of total control bell crank 199 pivoted at 201 to the right side frame plate 97. Link 280 (Fig. 11) is pivoted at its rear end to stud 272 on bell crank lever 273 pivoted to the right side frame plate. The forwardly extending arm of the bell crank 273 has a stud 274, which rides the edge of cam plate 275 pinned to shaft 295. The latch 269 is urged toward the top of link 271 by a spring 281 and bell crank lever 273 is urged against the edge of cam 275 by a spring 282. As the machine commences operation and cam plate 275 rocks counter-clockwise, link 280 moves forward. The fact that latch 269 is riding the upper surface of link 271 causes it to snap into notch 283, and on the return movement of plate 275 the link 280 is drawn rearwardly, carrying link 271 with it. This rocks key release lever 241 (Fig. 5), releasing depressed keys, and conditions the machine so that another cycle of operation is automatically initiated, as described in the before-mentioned Frieberg et al. application, Serial No. 323,462, to which reference is directed for a more detailed description of the two-cycle control mechanism.

As described in that application, the rearward movement of link 271 rocks a totalizer sensing lever 284 (Fig. 12), which tests the condition of the totalizer from which a total is to be taken, to determine whether it is a negative or positive amount, so that the totalizer may be shifted accordingly, and as before mentioned, rocks the total control bell crank lever 199 (Fig. 11), before mentioned, counter-clockwise. The machine ordinarily is conditioned to take a total from the upper, or "A," totalizer, when the totalizer key is depressed, as the upper end of total bell crank lever 199 rocks away from stud 200 of pitman 192, allowing the pitman 192 to swing clockwise around pivot 191 and disengage from stud 197 of hook lever 198, thus preventing the movement of pitman 192 from disengaging the upper totalizer on the first half-cycle. Thus, as the stop bars move forward in the first half of the second cycle of a total-taking operation, the stop bars are stopped by the totalizer wheels coming to zero position against the associated transfer pawl stop surfaces, setting up the amount of the accumulated total of the upper totalizer on the diverging levers, which consequently set up that amount at the printing station. As totalizer bell crank lever 199 rocks counter-clockwise, stud 228 thereon moves away from pitman 223, which controls the "B" totalizer, but the "B" totalizer still is disengaged in the first half of the second cycle of a total-taking operation because lever 285 presses against stud 286, but as the pitman 223 moves downwardly and the disengagement of the lower totalizer takes place, the stud 286 falls against surface 287 of lever 285 in response to the action of spring 288, and the pitman disengages from stud 205, leaving the totalizer disengaged until the end of the total-taking operation, at which time the lever 289 kicks it home. If it is desired to take a total from the "B" totalizer, the key 70 (Figs. 1 and 13) is depressed, which pushes down on a slide 290 (see also Fig. 3) supported at its upper end by a stud 291 operating in a slot in slide 290, and at its lower end secured to the forwardly extending arm of a bell crank lever 292 pinned to a shaft 293. The upwardly extending arm of bell crank lever 292 is pivoted to a link 294 (see Fig. 12), which causes lever 295 to rock clockwise, as seen in Fig. 12, to adjust the totalizer sensing mechanism so that the negative or positive condition of the "B" totalizer may be ascertained, as is more fully explained in said Frieberg et al. application, Serial No. 323,462.

Referring to Fig. 13, the right end of shaft 293 has secured thereto a lever 296, coupled by a pin and slot connection with a lever 297, pivoted to the frame at 298, the rear end of which lever 297 moves downwardly as key 70 is depressed, causing the counter-clockwise movement of lever 299, which is pivoted to a link 300 at 301, raising the link. A non-add control lever 302 is pivoted to the frame at 303, and has a stud 304, on the rear end thereof, working in a slot in link 300. As link 300 moves upwardly the lever 302 rocks counter-clockwise sufficiently so that a stud 305 thereon moves into the path of movement of the end 306 of hook 203. At the same time, the rear end of lever 302 bears against a stud 307 on a lever 308 pivoted to the frame at 309, rocking it clockwise.

Said lever 308 has a bent-over ear 310, which when link 300 is raised, moves toward the stud 311 on a lever 312, pivoted to stud 190. The surface 313 on lever 312 bears against the stud 200 on pitman 192 to hold the pitman 192 in engagement with stud 197 if the lever 312 is not allowed to move. Lever 312 is free to move except when key 70 is depressed. When key 70 is depressed, the ear 310 cramps against stud 311, preventing lever 312 from moving, and hence, the pitman 192 is held in engagement with the stud 197 during the first part of a machine cycle so that the "A" totalizer is disengaged at the beginning of a total-taking operation involving the "B" totalizer. As the pitman 192 is moved forwardly and downwardly the surface 313 rides off the stud 200, so that the pitman 192 is disengaged from the lever 198 by spring 196 and the stud 305 being in position to unhook lever 198 from the totalizer cam plate 145, the "A" totalizer stays in disengaged position until the close of the cycle, at which time plate 275 (Fig. 11) strikes a stud 314 on total cam plate 145, throwing it counter-clockwise and reengaging the "A" totalizer. Thus the "A" totalizer stays disengaged during each cycle of the total-taking operation. The upward movement of link 300 by its arm 314 rocks out of the way the lever 285 allowing pitman 223 to swing away from stud 225 so that on downward movement of the pitman the "B" totalizer is left in engagement with the totalizer wheels. The "B" totalizer is disengaged at the middle of each cycle of the total-taking operation by reason of the fact that pitman 223 is swung by spring 288 to engage a stud on hook plate 226. The upward movement of pitman 223 at the end of the first half of each total-taking cycle rocks plate 226 clockwise, disengaging the "B" totalizer. The "B" totalizer is kicked to engaged position at the end of each cycle by lever 289, before described.

On sub-total operations the depresison of the sub-total key 64, moves downwardly, on supporting studs 247 and 248 (Fig. 2), the sub-total slide plate 315, which carries with it the total plate 245, setting into operation all those things which have been mentioned in connection with total-taking, that is to say, sets into operation a two-cycle machine operation, which would take a total from the "A" or the "B" totalizer, depending on whether or not the "B" total key was depressed, except that the selected totalizer is not disengaged at the end of the first half of the machine operation. Pivoted at 316 is a slotted lever 317 having a slot 319 in which plays a stud 318. This lever 317 is rocked counter-clockwise by sub-total slide 315 by the action of foot 320 on stud 321.

Referring to Fig. 5, stud 318 is mounted on a lever 322, pivoted to shaft 323. Coupled by a pin and slot connection to lever 322 is a link 324 pivoted at its bottom end to total control bell crank lever 199. Lever 324 has a stud 325, which when the lever 322 moves counter-clockwise as the sub-total key is operated, moves to the right to a place where it interferes with the clockwise movement of pitman 192, so it will not couple with hook plate 198 at the end of the first half of the second machine cycle to disengage the "A" totalizer, thus sub-totaling the "A" totalizer. In a similar manner stud 326 on lever 324 interferes with the clockwise movement of pitman 223, so that it fails to engage the hook lever 226 of the "B" totalizer in the event that a reading is being taken from it, thus sub-totaling said "B" totalizer.

The type 104 (Fig. 4) are individually movable, from the position shown, toward the platen, upon being hit on their forward ends by hammer faces 337 of hammers 338 pivoted on printer cross shaft 339 and urged in the direction of the type by individual springs 340. The printing hammers are normally held in latched position by individual latches 341 urged in a latching direction by springs 342. The printing is done at mid-cycle through the action of a stud 344 secured to an arm 345 pinned to main drive shaft 86. As arm 345 starts rocking counter-clockwise it strikes a surface 346 on an arm 343 pivoted on shaft 339. Mounted on arm 343 is a shaft 347 which is supported at its other end by a second member supported from shaft 339 to form a bail upon which are rockably mounted latch release pawls 348, opposite their corresponding latches 341. There is one of these hammer systems for each denominational order. Each latch pawl is held inactive by an associated stud 349 on the associated type bar member until the type bar member moves upward at least to bring the first significant digit type into printing postion. If, however, a type bar has a movement sufficient to bring the type into alinement with the platen, the forward end of the pawl will rock counter-clockwise so as to be in line with surface 356 of its associated latch, and upon movement of arm 343 clockwise around shaft 339, the latches of all those printer bars which have been raised to printing postiion will be released and the hammers are free to strike the type or, if non-print blocking members are in the way, to be stopped against them, in the well known manner.

The symbol printing mechanism, the credit balance mechanism by which the machine takes a total or a sub-total from the totalizer pinions or the idler pinions, according to the sign of the total, and various key latching and locking mechanisms which are not particularly pertinent to the invention of this application, and which have been previously disclosed in the Frieberg et al. application No. 323,462, will not be discussed in detail, and reference to that application is made for disclosure.

*The semi-automatic cross tabulating paper carriage*

Figure 6:
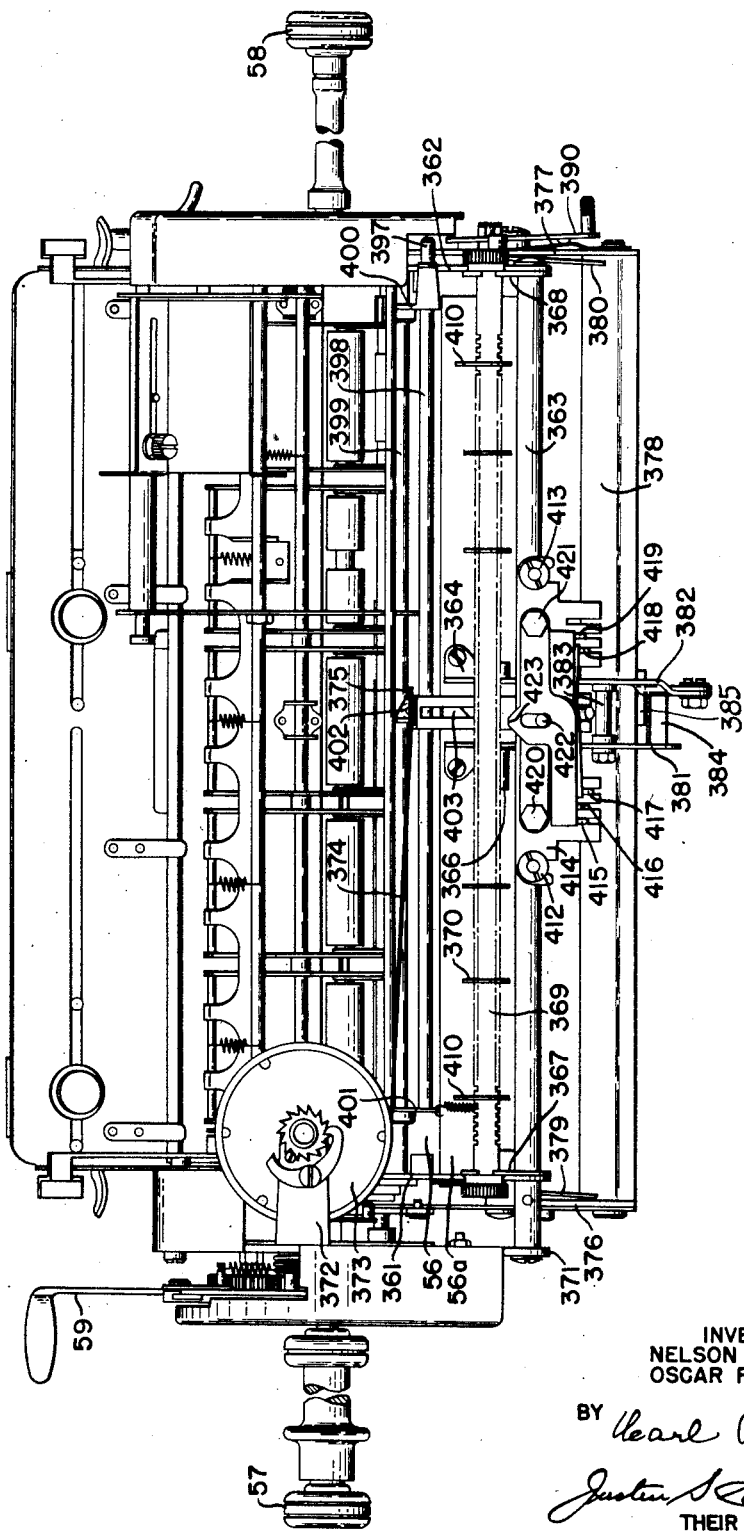
Fig. 6 is a view of the paper carriage from the rear, showing the carriage control mechanism.

Referring to Figs. 1, 6 and 11a, the stationary rail 56a, before-mentioned with reference to Fig. 1 is secured on blocks on the rear ends of the side frame plates 96 and 97, and has mounted thereon for sliding action cross-wise of the machine, by means of ball bearings and a retaining flange 360, the movable paper carriage rail 56. Secured to the two ends of rail 56 are side plates 361 and 362, which are connected at their rear lower ends by a cross rod 363, which rides between two supporting non-friction rollers held in a bracket unit 364, secured to stationary rail 56a.

The movement of the carriage frame to the left is limited by the striking of a stop boss, on the inside of plate 361, against the end of pin 366 held in an arm extending rearwardly from the middle of rail 56a. The movement of the carriage frame to the right is limited by the striking of a similar boss on plate 362 against the other end of pin 366. Removably secured in slotted ends of brackets 367 and 368, fastened to the rear ends of side plates 361 and 362, is a slotted stop form bar 369 on which may be slipped control stops of the general construction of the stop 370 (Fig. 15a) by which the tabulation of the carriage may be controlled, as will be described a little later, these stops also being provided in shapes such as shown in Figs. 15b to 15f, inclusive, to control the end movement of the carriage and to control certain machine functions.

Attached to the left end of cross rod 363 is an auxiliary side plate 371, which is anchored at its top to side plate 361, and secured to auxiliary side plate 371 is a bracket 372, supporting a spring reel 373 around which is wound a tape 374, the outer end of which is secured to a lug 375 on the bracket unit 364. The carriage thus is urged to the left, as viewed from the front of the machine, or to the right as viewed in Fig. 6, and will move in that direction unless otherwise restrained.

Pivoted to carriage side plates 361 and 362 are bail support arms 376 and 377, between which is mounted a bail 378. The bail is urged inwardly toward the rear of the machine proper by springs 379 and 380. Swingably mounted on pin 366 is a bracket formed of two arms 381 and 382, held in spaced relation by pin 383 and a bridging piece 384, on which is mounted a roller 385 (Fig. 11a), against which bail 378 rests, being forced against it by springs 379 and 380, and thus holding an extension foot of arm 382 against a roller 386, mounted on lever 387, which is, in turn, secured on main drive shaft 86. As the main drive shaft rocks clockwise and then counter-clockwise during a machine cycle, the bail 378 will rock around its center of movement 389 first counter-clockwise and then clockwise, as seen in Fig. 11a. Pivoted on the same stud as arm 377, which arm has secured thereto a spring plate 388, is a lever 390. Lever 390 has two positions. The position shown in Fig. 11a, where it is held by a stud 394 engaging a dimple in plate 388 is a non-tabulating position. A cam portion 391 of lever 390 holds a pawl 392, pivotally mounted on arm 377, rocked clockwise against the tension of a spring 393, rendering the pawl ineffective. The effective tabulating position of lever 390 is clockwise where stud 394 engages dimple 395 in plate 388, and where pawl 392 is permitted to rock counter-clockwise to an effective position where shoulder 396 on pawl 392 will, when bail 378 rocks counter-clockwise around center 389, engage a stud 397 (see also Fig. 6) on the end of a bail support arm 400, secured to shaft 399. The shaft 399 has secured on its other end an arm 401. Arms 400 and 401 support a bail 398 which remains stationary as pawl 392 flips under stud 397 on the first half of a machine cycle. On the return of the pawl on the last half cycle the pawl rocks the bail upwardly and passes under stud 397 allowing bail 398 and pawl 392 to return to normal. Bail 398 runs under a roller 402 (Figs. 6 and 11b) supported on a bracket secured to the side of a tabulating control pawl 403 pivoted on a pin 404 on bracket unit 364. The pawl 403 is normally urged downwardly in a slot 405 in said bracket unit by a spring 406, so as to be in the path of stops, such as stop 407 on stop bar 369, the upper arm of each of such stops, engaging the pawl 403 on movement of the carriage in response to the pull of the tape. The pawl 403 is beveled at 408 on the left side, so the carriage may be returned to the right, as viewed from the front of the machine, without interference of the intermediate stops, to be stopped by the terminal stop, such as the stop 409 (Fig. 15c), the upper arm of which is wide enough so it stands above the bevel 408 (Fig. 11b) of pawl 403. This stop 409, with the extra high stop surface, may be placed any place on the stop form bar that is selected for the end movement of the carriage to the left or to the right. The ordinary stops which are intermediate of the end stops, such as stop 409, by-pass the pawl 403 on movement of the carriage to the right.

Figure 15A:
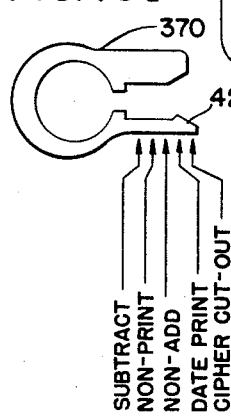
Figs. 15a to 15f represent the various stop controls which may be selectively used on the carriage.
Figure 15B:
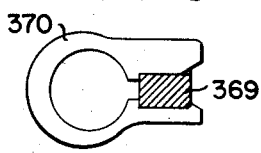
Figure 15C:
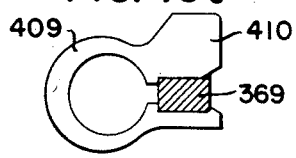
Figure 15D:
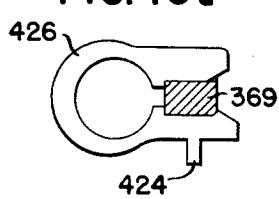
Figure 15E:
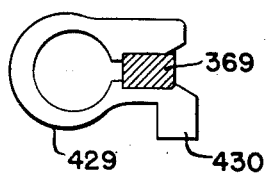

If the carriage is returned to the right against end stop 410 (Fig. 6), which is the equivalent of stop 409 of Fig. 15c, successive machine operations will cause step-by-step cross tabulation movement of the carriage according to the position of the intermediate stops.

*The carriage control mechanism*

Secured by screws 412 and 413 (Fig. 6) to bracket unit 364 is the support plate 414 of the carriage control cam lever unit, said plate having a downwardly opening guide comb for side support of the rear ends of control levers 415, 416, 417, 418 and 419, which will be later described in detail. Control levers 415, 416, 417, 418 and 419 control, respectively, the subtract, non-add, cipher cut-out, date printing, and non-printing functions of the machine. Referring also to Figs. 11a and 18, plate 414 has studs 420 and 421, on which are pivoted five interponent cam levers in spaced relation, two of them on stud 420 cooperating with control levers 418 and 419, and three of them for cooperating with control levers 415, 416 and 417, being pivoted on stud 421. Each of the five levers has a slot through which a pin 422 passes, to limit their movements. Pin 422 is secured in plate 414. The outer end of each of the levers pivoted on studs 420 and 421, rests on the end of its associated control lever, the interponent levers being successively shortened in step-wise manner, and the control levers likewise being successively shortened in a stepwise manner, as shown in Fig. 18. Each of the interponents is provided with a cam hump (Fig. 6), in line with the tabulating pawl 403, so that if a stop resting against the tabulating pawl has a control contour on its bottom arm, such as those shown in Figs. 15b, 15e, and 15f, it will rock down the corresponding interponent lever, or levers, and rock the associated control lever or levers. As shown in Fig. 15a, with reference to the stop 370, which is not shown mounted on a stop form bar 369, as it is in Fig. 15b, the lower arm 425 has no control formations and will only act to stop the carriage on a machine operation being performed, if it is the next one to strike the tabulating pawl 403. However, if there is a control formation, such as formation 424 (Fig. 15d) on control stop 426, the machine will be controlled to function in a manner corresponding to the position of control formation 424, and the different positions in which such formations may occur are shown in Fig. 15a by the arrows. It will be seen that formation 424 is positioned to cause the machine to non-print an amount which has been set up on the keyboard before an operation of the machine. The stop 427 of Fig. 15f has a formation 428 which controls the machine so that an amount set up on the keyboard is subtracted in the ensuing machine operation unless, as will be explained, the "Reverse" key 69 has been made use of. The stop 429 (Fig. 15e) has a multiple formation 430, which will operate the interponent levers to control the machine to print the date set up on the keyboard, to non-add amounts set up on the keyboard, and to block the printing of ciphers in the units and tens order, which would ordinarily be printed if an amount has been set up in the higher orders. Any arrangement of stop formations that suits the intended operation of the machine may be provided on the lower arms of the stops. The stops in indicated in the Figures 15c to 15f inclusive, are shown as they appear mounted on the stop form bar 369.

In the positions of the paper carriage, where it is desired to print a total, a stop of the type shown in Fig. 15a, without any control formations thereon, is used, and the control for total or sub-total-taking is brought about by use of the total or the sub-total key, which sets into motion a two-cycle machine operation in which the total or the sub-total is printed at the middle of the second cycle. This would cause the machine to tabulate during the first cycle and carry the record material and carriage beyond the intended printing column for the total or the sub-total, if such tabulation is not restrained. Therefore, two stops are provided in those positions, several steps apart, the first stop stopping the carriage a slight distance before the total column is reached, and the second stop stopping the carriage on the second cycle of the two-cycle operation in exact total column position.

Figure 15F:
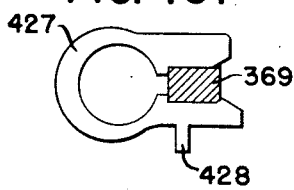

In order to explain the functioning of the carriage controls in the use of the machine of this invention, in debit and credit transactions, and the proving thereof, the operation of the machine, to make out the transactions appearing on the forms shown in Figs. 9 and 10 will be described. A customer's account form sheet 62 (Fig. 9) is placed in the carriage on the right end of the platen and the paper tape 61 is adjusted around the left end of the platen as shown in Fig. 1. The customer's form 62 is made out with the name and address of the customer, and in the space designated "Balance Forward" the old balance of $100.00 is printed prior to the debit and credit transactions made thereto. A non-print stop 426 (see Fig. 15d) is placed upon the stop form bar 369 at a place which will stop the carriage on its movement from right to left at a point in between the tape 61 and the form 62. This is the starting point of each transaction operation to be described. The old balance of $100.00 is set up on the digit keys 51 and the add motor bar 66 is depressed, starting a machine operation in which the amount of $100.00 is entered into the totalizers but is not printed owing to the control of the stop 426. The machine then tabulates to the next stop, which positions it in the "Date" and "Reference" column, that is to say, the carriage moves to the left until the printer elements 441 (see Fig. 1) are opposite the column 442, the control stop used for this position being stop 429 (see Fig. 15e). The month and day are set up on the date keys 52 and 53, and the folio reference number is set up on the rest of the digit keys, except the units and tens orders which are non-printed by reason of the cipher cut-out control. The add motor bar is depressed, setting the machine in operation, which prints the date and folio number in column 442, and tabulates the carriage to the "Charge" column 443, which is determined by a stop like stop 370 (Fig. 15b), which has no operation control. The amount of the charge, $25.00, is set up on the keyboard, and the motor bar 66 is depressed, causing a machine operation in which the amount of $25.00 is added into the totalizers, which makes the total therein $125.00. This entry is shown as the first charge transaction on the form 62 in Fig. 9. The carriage then tabulates to the "Credit" column 444, where it is stopped by a subtract stop, like stop 427 (Fig. 15f), but as there is no credit entry in this particular transaction, the motor bar 66 is operated and the carriage tabulates to the "Balance" column 445, where the carriage is stopped by a terminal stop, like stop 469 (Fig. 15c), and the sub-total key 64 is depressed, causing the machine to go through a two-cycle operation in which the new balance of $125.00 is printed with appropriate symbols. The carriage is then returned by hand toward the right to bring the left side of the tape in front of the printing elements 441, this being done by finger force applied to lever 60, which turns to advance the tape and customer's record sheet by one step, in the well known manner. The carriage is returned to the extreme right position and then allowed to settle to the left against the first control stop, which is a subtract stop, like stop 427 (Fig. 15f). In this position, on the left side of the tape, the old balance ($100.00) is picked up a second time by operating the digit keys and the add motor bar, and this amount will be automatically subtracted, leaving the net posting of $25.00 in the totalizer, which may be seen through the viewing aperture 54 (Fig. 1). The carriage tabulates to the next stop, which will position it on the right side of the tape, where it is stopped by a non-control stop, like stop 370 (Fig. 15b), and the total key is operated, which causes the machine to commence cycling, which immediately tabulates the machine to a second stop, like stop 370, right next to the first one, and as the second cycle is in progress, the total of $25.00 is printed. While the foregoing transactions are entered in both the upper and lower totalizers, only the last described total of $25.00 is taken from the "A" totalizer, leaving it clear, but leaving that balance of $25.00 in the "B" totalizer. The carriage is tabulated to the space in between the form 62 and the tape 61 at the non-print stop, and the machine is ready for the second transaction in which the old balance of $125.00 is picked up from line 1 of form 62, and entered into the machine. The machine then tabulates to column 442 where the date February 2, with the Folio No. 220 is printed, whereupon the carriage tabulates to the "Charge" column 443, where an item of $60.00 is charged. The machine is tabulated to the "Balance" column, and a sub-total taken, showing a new balance of $185.00. The carriage is then returned to the right and the old balance of $185.00 is subtractively entered into the totalizers, the machine tabulates to the total column on the tape, and a total is taken, showing the total of $60.00, which was the charge entry. The machine tabulates to the non-print position and the old balance of $185.00 is picked up, the date "February 5" is printed, and as there are no charges, that column is passed, and the machine stopped in the "Credit" column, where a credit of $200.00 is posted, the subtract stop causing a subtract entry in both totalizers.

The machine tabulates to the "Balance" column, where a sub-total is taken, showing a credit balance of $15.00. The carriage is then returned to the right, and the old balance of $185.00 is entered subtractively into the machine, and it tabulates to the total column where the total shows that $200.00 was credited, leaving the "A" totalizer zeroized, the sum of the charges and credits being left in the "B" totalizer. The carriage is tabulated to the non-print column where the next transaction is commenced, the old balance of $15.00, which is a credit balance, is entered subtractively by use of the "Subtract" key 65. The machine tabulates to the Date and Reference column 442, where a new date and folio number are set up and printed. The carriage thereafter tabulates to the "Charge" column where a $5.00 entry is made, and is finally tabulated to the Balance column where the sub-total shows a credit balance of $10.00. The carriage is then returned to the right where the old balance of $15.00 which otherwise would have been entered subtractively, is entered additively by using the "Reverse" key 69 to condition the machine before the motor bar is depressed, and the $15.00 is entered additively. The machine thereafter tabulates to the Total column, where the total of $5.00 is printed, showing that that was the charge made during the transaction, leaving the "A" totalizer at zero. At the end of a series of operations, a total may be taken from the "B" totalizer to show the net balance of charges and credits for the period, which in this case shows a credit balance of $110.00. This "B" totalizer having had the old balances entered into it both additively and subtractively, shows the net amount of the sum of the charges and credits.

*Carriage control of subtract operations and reverse key mechanism*

Figure 8:
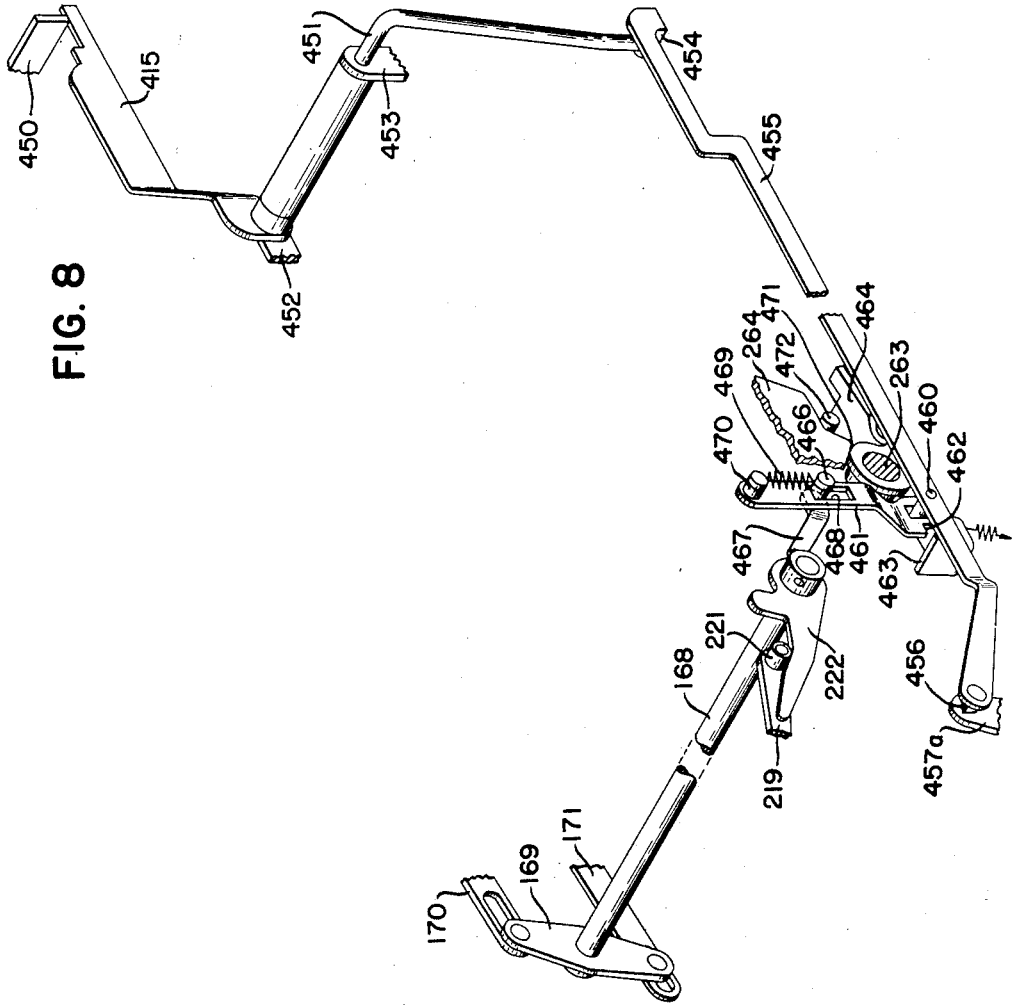
Fig. 8 is a view of the carriage-controlled subtract mechanism.

Referring, first, to Fig. 14, it should be remembered that the rocking of subtract control plate 219 clockwise, causes a stud 221 thereon to rock the lever 222 counter-clockwise, and that lever 222 is secured on shaft 168. This causes the lever 169 (Fig. 8) to rock counter-clockwise, as seen in Figs. 8 and 14, to condition the machine for subtraction on the ensuing machine operation. The rocking of plate 219, as has heretofore been described, was accomplished by pressing down on subtract key 65, which had an extension bearing down on stud 218.

Now, referring to Fig. 8, where the elements 168, 169, 221 and 222 are shown in perspective, the control of this subtract conditioning mechanism will be described with reference to the carriage stops. As a subtract stop 427 (see Fig. 15f) comes to the effective position over the cam lever unit assembly shown in Fig. 18, the lug 428 on the stop will press down on lever 450, which rests on the rear end of lever 415, to which reference has been made. Referring back to Fig. 8, lever 415 is secured to a bell crank shaped rod 451 mounted in brackets 452 and 453, supported by the machine framework, and the lower end of bell crank rod 451 is inserted through an ear 454 on the rear end of a link 455. The coupling between the rod 451 and ear 454 is such that the rod supports the rear end of link 455, yet is loose enough so that, as lever 415 is pressed down in the rear, the link 455 is moved forward. The forward end of link 455 is pivoted to square stud 456, held by lever 457a (see also Fig. 2) pivoted on stud 458. As link 455 moves forward the square stud 456 comes under foot 458a on total plate 254, preventing operation of the total-taking mechanism.

Referring back to Fig. 8, link 455 has a pin 460 extending from the side thereof, and embracing said pin is the forked lower end of coupling link 461, said link having a shoulder 462 which is adapted to move over an upwardly extending ear 463 of a lever 464, pivoted on stud 263. A stud 466 on the rearwardly extending arm 467 of lever 222, which is secured on shaft 168, extends into a slot 468 in link 461, and link 461 is held down, so the stud 466 is in the top of slot 468, by a spring 469 extending between stud 466 and a stud 470 on link 461. As cam plate 264 (see also Fig. 2) rocks counter-clockwise on the first half of machine cycle, a cam surface 471 strikes a stud 472 on lever 464, rocking it clockwise and, if link 455 has been moved forward, the ear 463 will move against shoulder 462, forcing link 461 upwardly, which through spring 469 will rock lever 222 counter-clockwise, turning shaft 168 and lever 169 to the subtract position. The parts are allowed to resume their natural add position at the conclusion of the machine operation, meanwhile, having conditioned the machine to enter data set up on the keys, in that operation, subtractively, into the totalizer. Spring 469 forms a yielding coupling between link 461 and shaft 168 and, consequently, any counter movement of shaft 168 by the "Reverse" key, next to be described, will be unimpeded.

*Reverse key*

If a subtract stop has moved link 455 forward so that, if not otherwise controlled, the ensuing machine operation will be a subtract operation, the operator can overcome this condition and make the ensuing machine cycle an add operation by pressing the "Reverse" key 69 (see Figs. 1 and 3) before pressing the motor bar 66. The lower end of key 69, which is slidably mounted in a bracket 473, secured to the left side plate of the key bank unit, has a beveled surface 474 which, when the key 69 is in its operated down position, will obstruct the movement of stud 475 as lever 169 tries to move clockwise to subtract position.

Referring to Fig. 8, the spring 469 will yield so that shaft 168 will not rock, even though link 461 moves upwardly. Key 69 has a stud 476, which, on by-passing the shoulder 477, locks under the shoulder to keep the key depressed. The shoulder 477 is on a latch plate 478, which is urged forwardly by a spring 479. The rocking of key release bail 230 at the end of a machine operation, through arm 480, which by-passed a pawl 481 on the first half of a machine cycle, strikes it on the last half of machine cycle, as it is held from counter-clockwise movement, to move plate 478 rearwardly, allowing key 69 to restore through the tension of spring 482. With this novel "Reverse" key control the carriage subtract control can be overcome, which is necessary when the balance of an account is a credit balance. Instead of being picked up the second time subtractively, it must be picked up additively.

*Carriage control of non-add operations*

Figure 7:
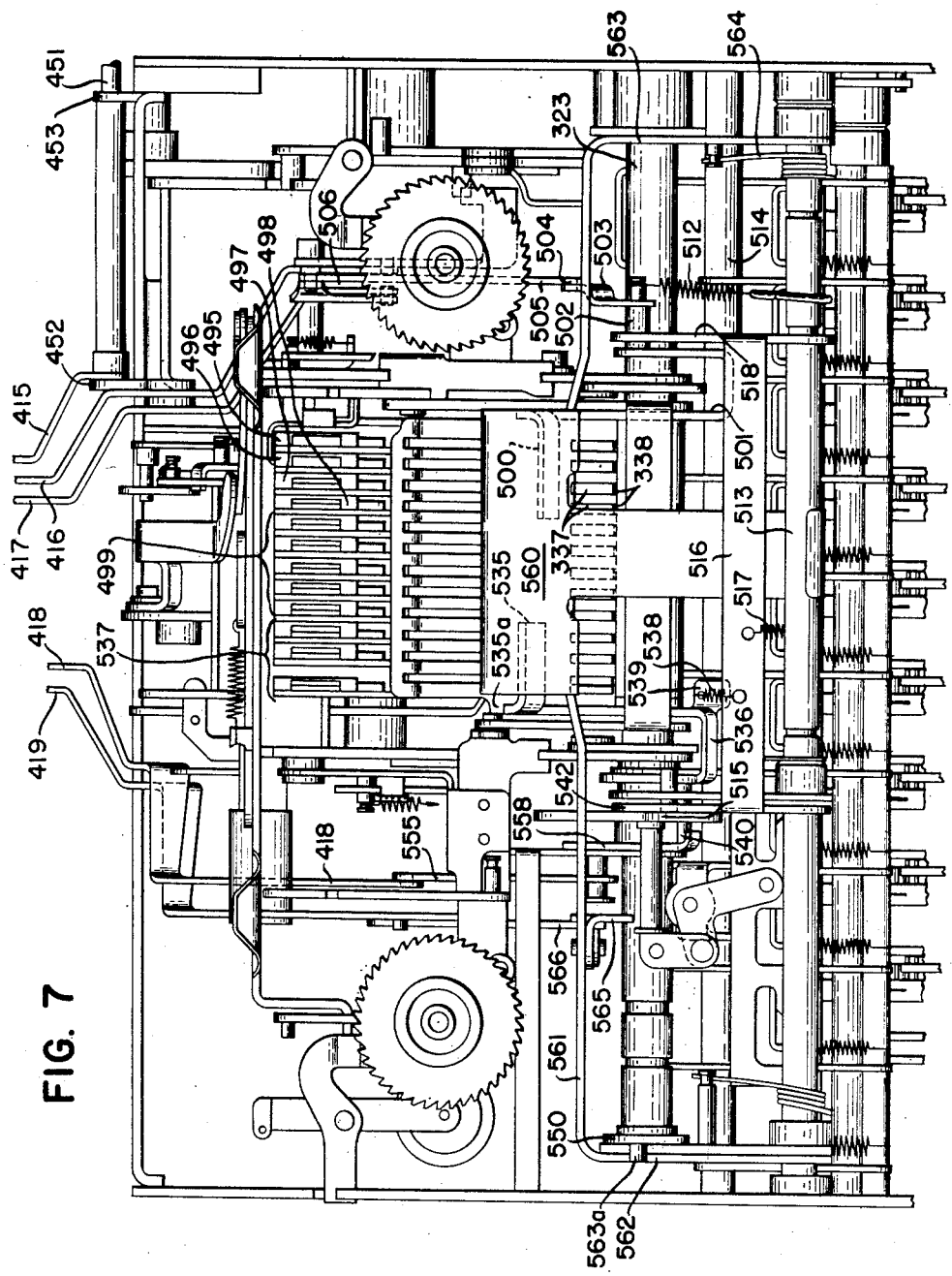
Fig. 7 is a top plan view of the printer section of the machine.

Referring to Figs. 7 and 20, the non-add carriage control lever 416 is pivoted at 490 to a frame-supported bracket. As a non-add formation on a control stop is positioned by movement of the carriage so as to rock down the rear end of lever 416, through lever 450a (see Fig. 18), the forward end thereof, which embraces a stud 491 on a plate 492 rocks upwardly, which causes the plate 492, rockably mounted on a frame supported stud shaft 493, to rock slightly counter-clockwise, as seen in Fig. 20. Plate 492 has a rearwardly extending ear 494, which, when plate 492 is rocked by the movement of lever 416, engages and lifts up, by contact with an ear 495, the bell crank 205a and its pin 205, sufficiently to take it out of the path of lever 186, so that in the ensuing machine operation the totalizers will not be engaged with the totalizer pinions just before mid-cycle, as normally is the case. The totalizers are thus non-added in said ensuing machine operation. The totalizers are reengaged at the end of the machine cycle, the upper, or "A", totalizer being engaged by plate 275 (Fig. 11), striking stud 314, and the lower, or "B", totalizer being struck by lever 289.

*Cipher cut-out control*

Referring to Fig. 7, the rightmost printer bar 495 carries the type symbols "A" and "B" to be set in printing position, according to whether the "A" totalizer or the "B" totalizer is having a total or sub-total taken therefrom. The printer bar 496 has thereon symbols which are indicative of the type of transaction, it having thereon indicia to print "—" to represent a negative entry, and characters to indicate that the machine operation was a total-taking operation, a sub-total-taking operation, a credit balance total-taking operation, or credit balance sub-total-taking operation. Their adjustment and operation during the different types of machine operations will not be explained as not being pertinent to the invention, and reference is made to the beforementioned application of Frieberg et al., Serial No. 323,462, where the mechanism is disclosed and explained in full.

Printer bars 497 and 498 are, respectively, the units and tens denominational order printer bars, each carrying type for zero and the digits from 1 to 9 inclusive, those of the tens order having in front of it a decimal point. The next five printer bars to the left are decimal digit bars, like those for units and tens order, said printer bars being bracketed by a bracket 499 for identification. These printer bars 499, as well as the units and tens printer bars, are used in data-entering operations wherein amounts are registered in the totalizers. They are also used to set up and print folio reference numbers when the carriage is in the Date and Folio Reference column 441, a non-add control on a stop being effective at that time to prevent entry of anything set up on those keys into the totalizers but not affecting the printing of such numbers. Because the digit numbers on the tens printer bar 498 have decimal points in front of them, it is desirable not to use the printer bars 497 and 498 for setting up folio numbers, so the cipher cut-out mechanism has been used in this machine to prevent the printing of numbers from those printer bars 497 and 498 when the carriage is in the Date and Reference column position. It will be remembered that the printing of a significant digit in any of the printer bars 499 will result in the printing of zeros in the digit printing bars to the right, so as to give the number in the full decimal figure, and that is the reason that the cipher cut-out mechanism is provided for stopping the printing of anything from the printer bars 497 and 498.

Referring to Fig. 4, it has been stated that the printing hammers 338 must strike the type in the type bars by impact of the hammer faces 337. These hammer faces 337 for the units and tens decimal orders are indicated in Fig. 7, where they are in alignment with a hammer block 500, which may be moved in and out of the path of movement of the hammers 338 of the units and tens digit orders, and hammer block 500 is in alignment with the hammers for the "A" and "B" symbol printing bar and the "Sign" printing bar.

Referring to Fig. 17, the hammer block 500 is an ear extending from an arm of a U-shaped bracket 501, rockably mounted on shaft 323 extending between the left and right side frame plates. Extending from an ear of the bracket 501, toward the right of the machine, is a pin 502, to the outer end of which is pivoted the top end of a bell crank lever 503, pivoted at 504 to a link 505, pivoted at its rear end to a lever 506, rockably mounted on stud shaft 493. This is the same stud shaft 493 on which the non-add mechanism of Fig. 20 is mounted. Bell crank lever 506 has a forwardly extending arm, in which is secured a pin 507 which is embraced by a U-shaped formation on the forward end of cipher cut-out control lever 417, rockably mounted on pin 490, extending from a bracket supported by the frame. A rearwardly extending arm 509 of bell crank 503 bears against a stop pin 510 on link 505, where it is held by a spring 511, forming a yielding connection between bell crank lever 503, and link 505. The cipher hammer block 500 normally is held upwardly in an ineffective position by a spring 512, extending between pin 502 and a shaft 513, extending between the side plates of the machine, the forward end of bracket 501 coming to rest against cross shaft 514 (seen in Fig. 7).

As a carriage control cipher cut-out stop bears down on the rear end of lever 417, link 506 is pulled rearwardly causing the hammer block 500 to lower in front of the four hammers on the right, thus preventing the printing of symbols and the two lowest zeros.

Figure 8A:
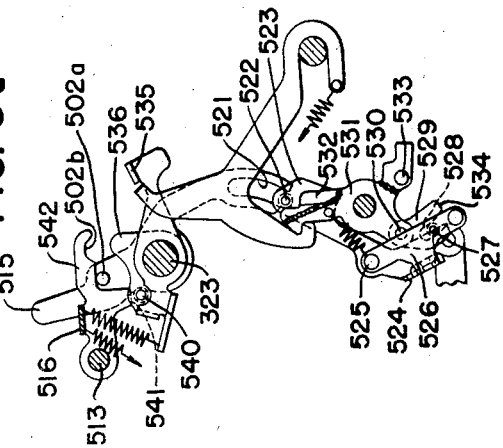
Fig. 8a is an elevation, as viewed from the right, of part of the date printing control mechanism.

A lever 515 rockably mounted on shaft 323 is rockable from a "Date" position as shown in Fig. 8a, to a "Normal" position as shown in Fig. 17. In the "Date" position the cipher cut-out mechanism just described is operative for the purposes stated and there is a break, or split, in between the printing hammer third from the left and the one fourth from the left so that the printing of a day-of-the-month figure will not cause the printing of zeros to the right in the orders of bracket 51 (Fig. 1). In the "Normal" position the cipher cut-out mechanism is disabled and the split between the printing hammers, just described, is recoupled.

Rockably mounted on shaft 513 (Fig. 17) is a bail 516 having a right arm 518 and a left arm 542 both extending rearwardly. A spring 517 urges the bail 516 down against a stud 502a (Fig. 8a) on lever 515. The lever 515 rocked in its counter-clockwise direction, as shown in Fig. 8a, is in its "Date" position where stud 502a rocks bail 516 counter-clockwise around shaft 513, and in its "Normal" position stud 502a rests in notch 502b allowing bail 516 to rock clockwise to where arm 518 (Fig. 17) bears against stud 502 preventing the hammer block 500 from coming to effective position. When lever 515 is in the position where it overcomes the control of the carriage over the cipher cut-out hammer block 500, the four righthand hammers will fire unless otherwise prevented.

In a full keyboard adding machine it is customary to automatically print ciphers to the right of any significant digits set up on the keyboard. That is to say, if the sum $1,000.00 were set up on the keyboard, only the one key to set up the "1" would have to be depressed and the ciphers to the right would be automatically printed. In this machine, this is carried out by providing each printing hammer latch, representing a row of digit keys, with a bent-over ear 520 (Fig. 4), which will lie to the rear of the printing hammer latch of next higher order, so that if the printing hammer latch of the next higher order is fired, it carries with it the printing hammer latches associated with all the denominational orders except that the fourth hammer latch 531 (Fig. 8a) from the left has no such ear, but has a coupling which, if made, causes the printing hammer latch associated with the lower of the two orders bracketed as 52 (Fig. 1), to carry with it the printing hammer latch associated with the highest of the orders bracketed as 51, and there being no such association between the said two printing hammer latches when uncoupled. It is arranged that when the lever 515 is in the "Normal" position where it overcomes the control of the automatic cipher cut-out, that is to say, when the top of the lever 515 is in the rearmost position, the two printing hammers will be coupled together by operation of the coupling means by said lever 515, and vice versa. This is provided so that when the machine is conditioned to take entries from data set up on the entire digit key bank, comprising the rows bracketed 51 and 52 in Fig. 1, the zeros to the right of significant digits in the highest two digit banks will print. When the upper part of the lever 515 is in the rearmost position it normalizes the keyboard so that a number occupying the whole digit keyboard may be set up and registered. In other words, instead of using the rows embraced by bracket 52 for setting up the date, they may be used for entering digital data in conjunction with the keys embraced by bracket 51. As has been said, this involves a split between the upper two denominations of the printing mechanism and the lower seven denominations, and the split for the printing hammer coupling will now be described. The lower end of lever 515 is bifurcated as seen at 521 (Fig. 8a). Referring to Fig. 8a, the bifurcated portion of lever 521 embraces a stud 522 of the upper extending arm 523 of a bail 524 supported for rocking motion on a shaft 525, supported in the printer frame. On the right end of bail 524 is mounted a bracket 526 having a stud 527. The stud 527 rides in a slot 528 on a swinging interponent 529 pivoted at 530 to the lower end of the printing hammer latch 531 of the seventh denominational order counting from the right. The printing hammer latch 531 has no bent-over ear, whereby it is automatically moved to unlatched position when the printing hammer 532 of next higher order moves to unlatching position, but must be moved through the action of stud 533 on face 534 of interponent 529, if that interponent is in position whereby, as stud 533 moves rearwardly, it makes contact with face 534. The parts are so positioned that, as the lever 515 is moved to "Normal" position, the interponent will be positioned where face 534 is in line with stud 533, and the unlatching of latch 532 will carry with it latch 531. If, on the other hand, the lever 515 is shifted so the upper end is in the forward "Date" position, the interponent will swing clockwise, as shown, around pivot 530, and take face 534 out of alignment with stud 533, thus preventing the unlatching movement of latch 532 from carrying latch 531 with it.

In this machine, however, there is provided a normally effective hammer block 535 (see Fig. 7), which is an ear extending from a bracket 536, mounted for rocking motion on shaft 323, and which is held in an effective position to block the printing hammers of the three highest printing type bars by spring 538, extending between bail 516 and an extension plate 539 on bracket 536, the bracket being stopped in its movement in effective position by a foot on bracket 536 striking a hammer guide comb 535a. As lever 515 is moved in the "Normal" direction the bail 516 lowers, and a surface 541 of arm 542 bears down on pin 540 on bracket 536, rocking bracket 536 and the hammer block 535 to ineffective position, thus permitting the printing of numbers set up on the two highest digit denominational order rows of keys 52, as seen in Fig. 1, on each item or total operation.

Date print control from carriage

As has been said, hammer block 535, when the lever 515 is in the "Date" position, is effective to block the three leftmost printing hammers, but if a "Date" control stop is moved over the rear end of "Date" control lever 418 (Fig. 19) which is pivoted on pin 552 supported by a bracket 553 on the frame, the rear end of lever 418 is forced downwardly and the forward end pivoted at 554 to a lever 555 is forced upwardly. The downwardly and rearwardly extending tail of lever 555 is held against a stud 556 on lever 418 by a spring 557 to form a yielding coupling between levers 418 and 555. The forward bifurcated end of lever 555 embraces a stud on lever 558 rockably mounted on shaft 323, and a bent-over ear thereon rides on top of pin 540 before-mentioned (see Fig. 8a) and will bear down on pin 540 as lever 558 rocks clockwise, as seen in Fig. 19. This will move hammer block 535 to ineffective position so the three left-most printing hammers will strike the type and print the date.

Non-print control from carriage

A non-print, hammer blocking plate 560 (Fig. 7) has a forwardly projecting tail wrapped around shaft 513 and is additionally supported on a bail 561 having arms 562 and 563 also rockably supported on shaft 513. The bail is held rocked upwardly against stud 563a on "Non-Print" lever 550 (see Fig. 1) by a spring 564 on the right side arm 563. As the top of lever 550 is pushed rearwardly stud 563a presses down on a camming formation of side arm 562 lowering the rear end of blocking plate 560 which has a downwardly extending lip which thereby is moved in front of all the printing hammers, preventing any printing action.

When the top of lever 550 is pulled forward and bail 561 is allowed to rise under the action of spring 564, it may be pulled down independently by a link 565 (see also Fig. 16) which has a pin-and-slot coupling with bail 561. The lower end of link 565 has a stud which is embraced by the forked rear end of lever 566 pivoted to a lever 567 pivoted to a frame-supported stud 568. The tail of lever 566 is held against a stud 569 on lever 567 by a spring 570, forming a yielding coupling. A rearwardly and downwardly projecting arm of lever 567 is pivoted to the carriage-controlled non-print lever 419 pivoted to bracket 553 and is rocked counter-clockwise when a non-print carriage stop is in effective position. This, through the foregoing linkage lowers bail 561 with the same effect as if it had been done by non-print lever 550.

When the "Date" and "Normal" lever 515 is moved to normal position a stud 571 (Fig. 7) extending to the left therefrom rides under a cam formation 572 on link 565 forcing the non-print bail upwardly if it had been urged down by a carriage control stop, thus overcoming the carriage non-print control. The pin and slot coupling of link 565 to bail 561 and the yielding coupling held together by spring 570 permit this to happen without straining the parts.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a calculating machine having a cyclically operable main operating means; a totalizer adjustable to receive add or substract item entries; differentially settable means for entering data into or taking accumulated data from the totalizer; means for controlling the excursion of the differential means during item-entering operations according to the value of such items; means to print the items entered into the totalizer or the accumulated data taken therefrom; and a tabulating carriage for holding record material; the combination therewith of stops which are mounted on the carriage to determine the various columnar positions the carriage may assume with respect to the printing means, one or more of the stops having subtract formations; subtract means movable to effective position to cause the main operating means to adjust the totalizer at the beginning of a machine cycle to receive item entries subtractively; a subtract key and associated movable means, which key, when operated, moves the subtract means to effective position through the associated movable means; automatic subtract control means movable from an ineffective to an effective position, in which effective position the main operating means, at the beginning of a machine cycle, will actuate it to move the associated movable means to cause the subtract means to move to effective position; and means resiliently yieldingly coupled to the movable means associated with the subtract key and actuated by a control stop having a subtract formation, when such control stop determines the carriage position, to move the automatic subtract control means to effective position unless the movable means associated with the subtract key is prevented from moving.

2. The machine of claim 1, in which there is a lever moved by the main operating means at the beginning of each machine cycle, and in which the coupling is moved by the subtract control formation of a stop when such stop determines the carriage position so the coupling is in the path of movement of the lever and is moved thereby to move the associated movable means.

3. The machine of claim 2 in which there is provided a reverse key which, when operated, moves the subtract means to ineffective position if not already there, the yielding coupling permitting such, the reverse key thereby overriding any control of the subtract means by the carriage.

4. The machine of claim 1 in which there is provided a reverse key which, when operated, moves the subtract means to ineffective position if not already there, the yielding coupling permitting such, the reverse key thereby overriding any control of the subtract means by the carriage.

5. The machine of claim 1 in which there are two totalizers and in which the subtract means, when moved to effective position, causes the main operating means to adjust both totalizers to receive subtract entries.

6. In a calculating machine, the combination of a cyclically operable main operating means; one or more totalizers for receiving and accumulating digital data; differentially settable means for entering data into or taking accumulated data from the totalizers; a full key-board for controlling the setting of the differentially settable means, said keyboard including a plurality of decimal denominational rows of significant digit keys from "one" to "nine" inclusive, and there being an element of the differentially settable means for each denominational row of digit keys, each element being individually controlled by its associated digit keys; a printer bar coupled to each differential element and positioned thereby, each printer bar having a type for each significant digit of the denomination and zero, and the type that represents an operated key being positioned at a printing station during a machine cycle, the printer bar representing digits of the next to lowest order having type which includes a decimal point before each digit, and a printer bar being moved during a machine cycle to position the "zero" type at the printing station if no associated key is operated; a tabulating record material carriage having selectively positionable control stops by which the columnar position of the carriage is determined for a given machine operation, the carriage being constantly urged in one direction by power means, and the main operating means during a machine cycle after a printing period causing the carriage to tabulate to the next column as determined by the next stop; a printing hammer for each printer bar, each hammer being cocked at the conclusion of a machine operation against the urge of a spring by an associated latch, and each latch except that for the third from highest decimal order having a finger overlapping the latch of next higher order so the movement of a latch to unlatching position carries with it the latches of next lower orders; a pivoted member on the latch of the printing hammer of the third from highest decimal order; a formation on the latch of the printing hammer of the second from highest decimal order, the pivoted member, when swung from an ineffective position to an effective position, being in the line of movement of the formation when the latch of said second to highest denominational order moves to unlatching position, whereby the latch of the second highest decimal denominational order carries the latch of the third highest decimal denominational order with it on moving to unlatching position; a lever having a "date" position and a "normal" position, said lever being coupled to the pivoted member so that when the lever is in "normal" position the pivoted member will be swung to its effective position, and when the lever is in "date" position the pivoted member will be swung to its ineffective position; an interponent unlatching pawl member for each latch, each of said interponents being held in ineffective position by its associated printer bar unless the printer bar moves to position a significant digit at printing position, and the latches being given an unlatching movement during a machine cycle after the differentially settable means have been set to represent the data set up on the keys, whereby the printing of an amount will cause printing of zeros in the orders lower to that of the highest significant digit of the amount to be printed if no digit has been set therein, such not occurring between the second and third from highest orders, when the lever is in "date" position, whereby the two highest orders may be used to print day-of-the-month data without thereby causing zeros to be printed in all the lower orders; a first hammer block positionable from a normally ineffective position to an effective position where it blocks the printing hammers of the two lowest decimal denominational orders even though unlatched; a second hammer block positionable from a normally effective position where it blocks the printing hammers of the two highest decimal denominational orders, said lever when in "normal" position moving the second hammer block to ineffective position; means including a cipher cut-out lever which, when the cipher cut-out lever is actuated, moves the first hammer block to effective position; means including a date-print lever which, when the date-print lever is actuated, moves the second hammer block to ineffective position; and a date-print and cipher cut-out stop having thereon among other formations, a cipher cut-out formation, and a date-print formation, said stop being selectively positionable on the carriage to actuate the cipher cut-out lever and the date-print lever when the carriage is stopped by said date-print and cipher cut-out stop, whereby the rows of keys between the two lowest orders and the two highest orders may be used for printing reference numbers.

7. The machine of claim 6 in which there is a non-add control mechanism, actuated by a non-add lever when moved, for preventing data set on the keyboard from being entered into the totalizers during a machine operation, and in which the date-print and cipher cut-out stop is provided with a non-add formation which actuates the non-add lever when the carriage has been stopped by said date-print and cipher cut-out stop, whereby the date and reference data set on the keys is not entered into the totalizers during a machine operation.

References Cited in the file of this patent

UNITED STATES PATENTS

| Number | Name | Date |
| --- | --- | --- |
| 2,194,270 | Sundstrand | Mar. 19, 1940 |
| 2,229,765 | Bower | Jan. 28, 1941 |
| 2,643,818 | Sharpe | June 30, 1953 |